US012608352B2

(12) United States Patent
Stanley et al.

(10) Patent No.: US 12,608,352 B2
(45) Date of Patent: Apr. 21, 2026

(54) INJECTING SYNTHETIC ANOMALIES INTO DATA FOR BENCHMARKING DATA QUALITY MONITORING ALGORITHMS

(71) Applicant: Anomalo, Inc., Palo Alto, CA (US)

(72) Inventors: Jeremy Stanley, Croton on Hudson, NY (US); Viktoriya Andonova, Lisbon (PT); John Joo, Walnut Creek, CA (US); Jason Kozemczak, St. Louis, MO (US); Elliot Shmukler, Burlingame, CA (US)

(73) Assignee: Anomalo, Inc., Palo Alto, CA (US)

( * ) Notice: Subject to any disclaimer, the term of this patent is extended or adjusted under 35 U.S.C. 154(b) by 0 days.

(21) Appl. No.: 18/899,670

(22) Filed: Sep. 27, 2024

(65) Prior Publication Data

US 2025/0328506 A1 Oct. 23, 2025

Related U.S. Application Data

(60) Provisional application No. 63/636,568, filed on Apr. 19, 2024.

(51) Int. Cl.
*G06F 16/215* (2019.01)
*G06F 11/34* (2006.01)
*G06F 16/23* (2019.01)

(52) U.S. Cl.
CPC ........ *G06F 16/215* (2019.01); *G06F 11/3409* (2013.01); *G06F 11/3457* (2013.01); *G06F 16/2365* (2019.01)

(58) Field of Classification Search
None
See application file for complete search history.

(56) References Cited

U.S. PATENT DOCUMENTS 8,887,286 B2 11/2014 Dupont et al.
10,191,962 B2 1/2019 Shkapenyuk et al.
(Continued)

FOREIGN PATENT DOCUMENTS

WO 2025221286 10/2025
WO 2025221287 10/2025

OTHER PUBLICATIONS

Stanley, Jeremy , et al., "Automating Data Quality Monitoring Scaling Beyond Rules with Machine Learning", O'Reilly Media, Inc., released Jan. 2024, (chapter 1 available as early as Mar. 8, 2023, chapter 2 available as early as Apr. 20, 2023, chapter 3 available as early as Jun. 21, 2023, chapter 4 available as early as Sep. 28, 2023), 221 pages.

(Continued)

*Primary Examiner* — Richard L Bowen
(74) *Attorney, Agent, or Firm* — Henry Patent Law Firm PLLC

(57) ABSTRACT

In a general aspect, injecting synthetic anomalies into data is described. In some embodiments, a system identifies a base data set stored in a remote database system and a set of synthetic anomaly injection operations to apply to portions of the base data set. The system submits a set of instructions that are configured to cause the remote database system to perform operations including: creating one or more entries in a lookup table and rerouting received queries attempting to access the one or more portions of the base data set to instead access modified base data while the one or more entries are active. The system causes the remote database system to inactivate the one or more entries in the lookup table such that the remote database system ceases rerouting received queries.

24 Claims, 19 Drawing Sheets

(56) References Cited

U.S. PATENT DOCUMENTS

| | | |
|---|---|---|
| 11,030,167 B2 | 6/2021 | Nath et al. |
| 11,310,250 B2 | 4/2022 | Kursun |
| 11,449,712 B2 | 9/2022 | Pai et al. |
| 11,829,365 B2 | 11/2023 | Haile |
| 11,886,399 B2 | 1/2024 | Joyce et al. |
| 11,927,925 B2 | 3/2024 | Drees et al. |
| 2025/0328505 A1 | 10/2025 | Stanley et al. |

OTHER PUBLICATIONS

YouTube , "How unsupervised machine learning can scale data quality monitoring in Databricks", Transcript of Presentation available at https://youtu.be/SLINAuolfq4?si=hmklyKJt5uoDlqus, Jun. 30, 2022, 32 pages.
ISA, International Search Report and Written Opinion issued in PCT/US2024/048817 on Jan. 14, 2025, 11 pages.
ISA, International Search Report and Written Opinion issued in PCT/US2024/048925 on Dec. 17, 2024, 11 pages.
Stanley, et al., "Automating Data Quality Monitoring—Scaling Beyond Rules with Machine Learning", O'Reilly Media, Inc; pp. 65-121, 162, XP002812699; Jan. 1, 2024; 72 pages.
Tatarowicz, et al., "Lookup Tables: Fine-Grained Partitioning for Distributed Databases", 2012 IEEE 28th International Conference on Data Engineering, Apr. 1, 2012, pp. 102-113, 12 pages.

| listid | listtime | sellerid | numtickets | priceperticket | totalprice | eventid | eventname | catid | catgroup | catname | venueid | venuename | venuecity | venuestate | venueseats |
|---|---|---|---|---|---|---|---|---|---|---|---|---|---|---|---|
| 219247 | 2022-05-03 11:04:54 | 12619 | 4 | 1077 | 4308 | 1212 | Hairspray | 6 | Shows | Musicals | 201 | Ambassador Theatre | New York City | NY | 0 |
| 17151 | 2022-05-03 15:27:17 | 27222 | 3 | 106 | 318 | 7894 | Cypress Hill | 9 | Concerts | Pop | 30 | Verizon Center | Washington | DC | 0 |
| 157318 | 2022-05-03 9:16:35 | 22838 | 9 | 370 | 3330 | 629 | Seven Brides for Seve | 6 | Shows | Musicals | 213 | Cort Theatre | New York City | NY | 0 |
| 75570 | 2022-05-03 7:05:29 | 44301 | 4 | 298 | 1192 | 4974 | Peter Frampton | 9 | Concerts | Pop | 123 | Fox Theatre | Redwood City | CA | 0 |
| 230609 | 2022-05-03 8:08:54 | 9663 | 4 | 388 | 1552 | 1457 | South Pacific | 6 | Shows | Musicals | 249 | Paramount Theatre | Seattle | WA | 0 |
| 217754 | 2022-05-03 18:19:40 | 4999 | 6 | 1166 | 6996 | 2618 | A Man For All Seasons | 7 | Shows | Plays | 230 | Richard Rodgers Theatre | New York City | NY | 0 |
| 7743 | 2022-05-03 19:36:02 | 4474 | 24 | 34 | 816 | 6844 | Hall and Oates | 9 | Concerts | Pop | 86 | Lambeau Field | Green Bay | WI | 72922 |
| 39587 | 2022-05-03 14:13:25 | 37980 | 22 | 124 | 2728 | 4433 | Rock the Bells | 9 | Concerts | Pop | 96 | Oriole Park at Camden Y | Baltimore | MD | 48876 |
| 61926 | 2022-05-03 12:11:27 | 10637 | 12 | 368 | 4416 | 6995 | Gnarls Barkley | 9 | Concerts | Pop | 87 | Hubert H. Humphrey Metro | Minneapolis | MN | 64035 |
| 43729 | 2022-05-03 10:11:43 | 39835 | 4 | 131 | 524 | 4902 | The Who | 9 | Concerts | Pop | 74 | Reliant Stadium | Houston | TX | 72000 |

| Statistic | Definition | Baseline | New | % Change | Implication |
|---|---|---|---|---|---|
| Hours | The number of hours to run the benchmark in a massively parallel environment | 2.6 | 3.1 | 16% | This change is increasing the compute costs, and we may want to optimize it further |
| Alert % | How often the model will alert without synthetic issue introduced | 1.92% | 2.02% | 5% | We are slightly more likely to alert (we are finding more anomalies in the data without synthetic issue) |
| Precision | Fraction of time that alerts occur when synthetic issue was introduced | 0.858 | 0.866 | 1% | False positives are improved |
| Recall | Fraction of time that we alert when synthetic issue was introduced | 0.117 | 0.132 | 11% | False negatives are improved |
| F1-score | A form of average (harmonic mean) of the precision and recall | 0.205 | 0.228 | 10% | Both false positives and false negatives improve |
| Mean Score | The mean score when synthetic issue has not been introduced | 0.132 | 0.150 | 12% | The score is 12% higher even without synthetic issue |
| AUC | Area under the curse for the scores when used to predict if there was synthetic issue or not | 0.617 | 0.624 | 1% | The overall AUC is slightly higher |
| AUC - 0.5 | Improvement in the AUC above a random model | 0.117 | 0.124 | 5% | The anomaly scores are now a better predictor of whether synthetic issue is introduced, independent of our thresholding strategy |

Start ~1402

Receive instructions to perform synthetic issue injection on a base data set ~1404

Create a copy of modified data in a different location than the base data set ~1406

Record location in lookup table entry ~1408

End ~1410

1450

Start — 1452

Receive query directed to base data set — 1454

1456 — Active lookup table entry?

No

Yes

1458 — Create modified data

1460 — Return base data according to lookup table entry

1462 — Return modified data according to lookup table entry

1464

End

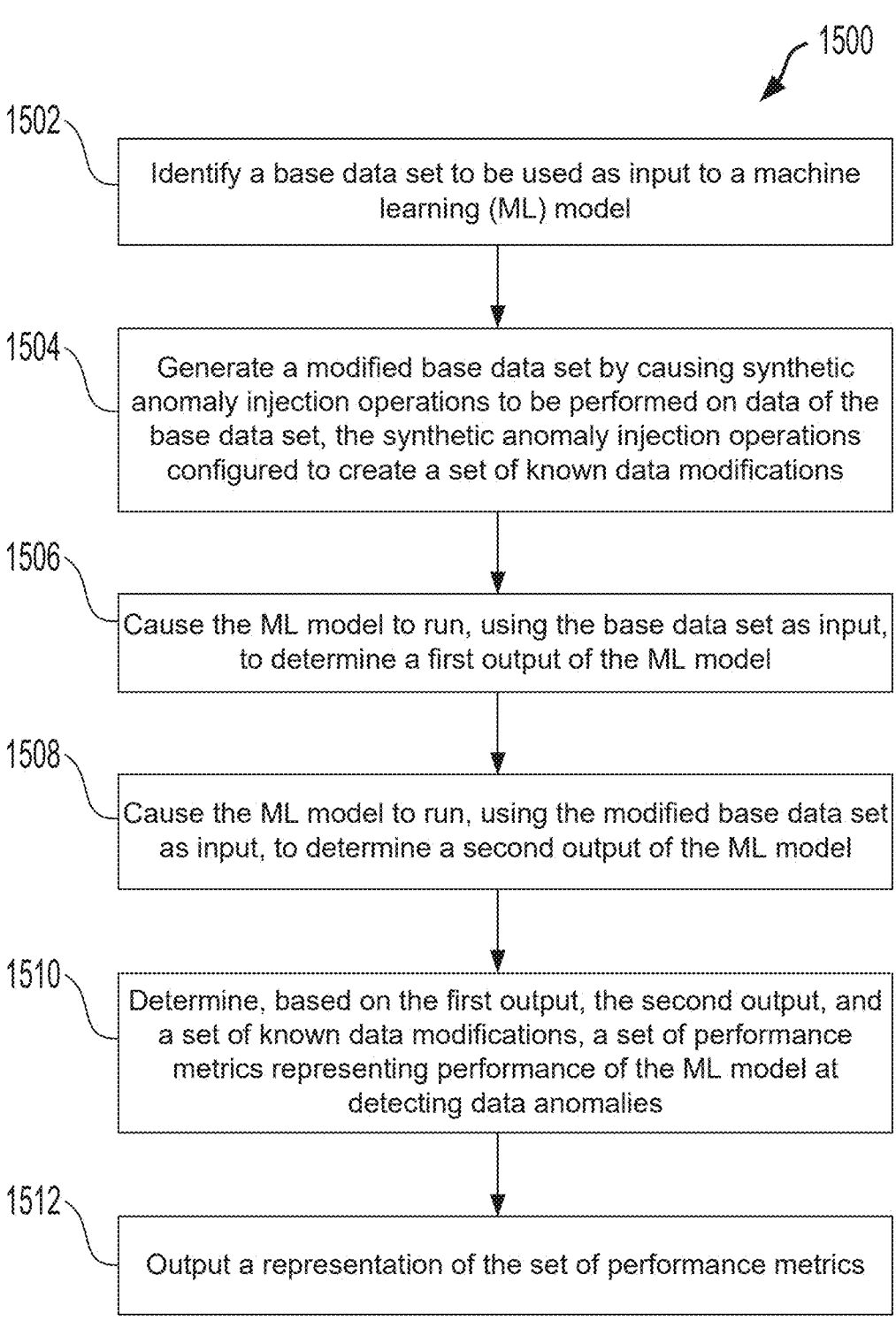

1500

1502 — Identify a base data set to be used as input to a machine learning (ML) model 1504 — Generate a modified base data set by causing synthetic anomaly injection operations to be performed on data of the base data set, the synthetic anomaly injection operations configured to create a set of known data modifications 1506 — Cause the ML model to run, using the base data set as input, to determine a first output of the ML model 1508 — Cause the ML model to run, using the modified base data set as input, to determine a second output of the ML model 1510 — Determine, based on the first output, the second output, and a set of known data modifications, a set of performance metrics representing performance of the ML model at detecting data anomalies 1512 — Output a representation of the set of performance metrics

FIG. 15

INJECTING SYNTHETIC ANOMALIES INTO DATA FOR BENCHMARKING DATA QUALITY MONITORING ALGORITHMS

CROSS-REFERENCE TO RELATED APPLICATIONS

This application claims priority to U.S. Provisional App. No. 63/636,568, filed Apr. 19, 2024, entitled "Techniques for Data Quality Monitoring," the entire content of which is hereby incorporated by reference.

BACKGROUND

This application relates to techniques for and related to data quality monitoring and reporting. Data quality monitoring has been used to discover potential data quality issues in a collection of data. Discovered issues are typically reported for appropriate handling. This monitoring and reporting can be aided by one or more data processing algorithms.

DESCRIPTION OF DRAWINGS

FIG. 7 illustrates a sample table of data.

FIG. 11 illustrates summary statistics and implications for an example model benchmark.

FIG. 15 illustrates an example process for benchmarking an ML model used for anomaly detection.

DETAILED DESCRIPTION

Figure 1:
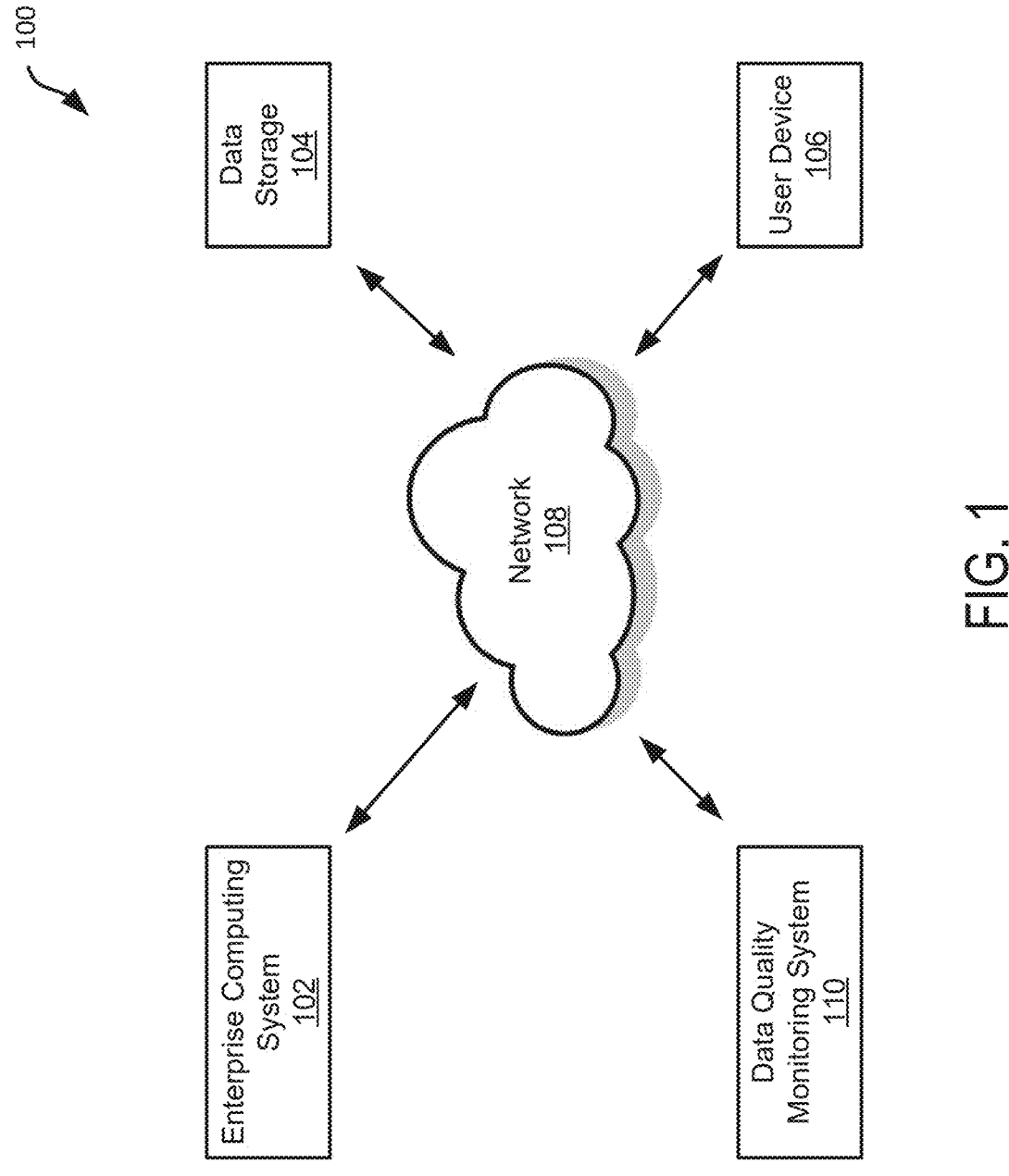
FIG. 1 is a block diagram showing aspects of an example computing environment that includes a data quality monitoring system.

FIG. 1 is a block diagram showing aspects of an example computing environment 100 that includes a data quality monitoring system 110. The example computing environment 100 shown in FIG. 1 includes enterprise computing system 102, data storage 104, user device 106, and network 108. The enterprise computing system 102, data storage 104, or user device 106 can include sources or identifiers of data (e.g., one or more applications, tables, and/or databases) that can be monitored, for example, by the data quality monitoring system 110. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, one or more enterprise computing system 102 in an organization's computing infrastructure manages (e.g., produces, receives, and/or ingests) volumes of data that contain valuable or useful information. An enterprise computing system 102 can store such data (e.g., at enterprise computing system 102 and/or at data storage 104) so that it becomes available as a data source to data quality monitoring system 110. The data may include data generated by the organization itself, data received from external entities, or a combination. By way of example, the data can include customer data, transaction data, network packet data, sensor data, application program data, observability data, and other types of data. Observability data can include, for example, system logs, error logs, stack traces, system performance data, or any other data that provides information about computing infrastructure and applications (e.g., performance data and diagnostic information). The data quality monitoring system 110 can monitor the data managed by the enterprise computing system 102. For example, the data can be monitored to diagnose missing data, diagnose erroneous data, diagnose anomalous data or trends, diagnose performance problems, monitor user interactions, and to derive other insights about the computing environment 100. Generally, the data managed by the enterprise computing system 102 does not have to use a common format or structure, and the data quality monitoring system 110 can generate structured output data having a specified form, format, or type. The output generated by the data quality monitoring system can be delivered to enterprise computing system 102, data storage 104, user device 106, or any combination thereof.

The enterprise computing system 102, data storage 104, user device 106, and data quality monitoring system 110 are each implemented by one or more computer systems that have computational resources (e.g., hardware, software, and/or firmware) that are used to communicate with each other and to perform other operations. For example, each computer system may be implemented as an example computer system (e.g., computer system 1700 of FIG. 17), or components thereof, for performing operations as described or illustrated with respect to FIG. 2, FIG. 3, FIG. 4, FIG. 5, FIG. 6, FIG. 7, FIG. 8, FIG. 9, FIG. 10, and/or FIG. 11, FIG. 12, FIGS. 13A-13B, FIGS. 14A-14B, FIG. 15, FIG. 16. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The enterprise computing system 102, data storage 104, user device 106, and data quality monitoring system 110 (and possibly other computer systems or devices) communicate with each other over the network 108. The example network 108 can include all or part of a data communication network or another type of communication link. For example, the network 108 can include one or more wired or wireless connections, one or more wired or wireless networks, or other communication channels. In some implementations, the network 108 includes one or more instances of: a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

Enterprise computing system 102 can include multiple user devices, servers, sensors, routers, firewalls, switches, virtual machines, containers, or a combination of these and other types of computer devices or computing infrastructure components. Enterprise computing system 102 can receive, ingest, detect, monitor, create, or otherwise produce data during operations it performs. This data can be provided to other devices and systems through the network 108. In some implementations, the data is streamed to (or otherwise made available to) the data quality monitoring system 110 as input data (e.g., input to one or more data quality monitoring processes).

In some implementations, the enterprise computing system 102 can include (or otherwise manage or provide access to) data sources such as one or more sources of events (e.g., such as Kafka, Segment, Amazon Kinesis, etc.), one or more databases (e.g., Oracle, PostgreSQL, Microsoft SQL Server, etc.), one or more software-as-a-service applications (e.g., Stripe, Salesforce, Facebook Ads, etc.), and/or data feeds (e.g., SFTP, Excel, APIs, etc.). In some implementations, computing system 102 includes (and/or coordinates with) data transformation and orchestration services and/or software (e.g., Matillion, Fivetran, Apache Airflow, DBT, Apache Spark, SQL, etc.). In some implementations, computing system 102 includes (and/or coordinates with) cloud data warehouse or data lake services and/or software (e.g., Amazon Redshift, Snowflake, Google Big Query, Presto, Databricks, etc.). In some implementations, the enterprise computing system 102 can also include applications that act as data sources.

In some implementations, an application (e.g., acting as a data source) includes a collection of computer instructions that constitute a computer program. The computer instructions can be compiled or interpreted. An application can be contained in a single module or can be statically or dynamically linked with other libraries. The libraries can be provided by the operating system and/or the application provider.

The data storage 104 can include multiple user devices, servers, databases, hosted services, other types of data storage systems, and/or a combination of these. Generally, the data storage 104 can operate as a data source or a data destination (or both). In some implementations, the data storage 104 includes a local or remote filesystem location, a network file system (NFS), Amazon S3 buckets, S3-compatible stores, other cloud-based data storage systems, enterprise databases, systems that provide access to data through REST API calls or custom scripts, or a combination of these and other data storage systems. Data from the enterprise computing system 102, as well as data analytics and other output from the data quality monitoring system 110, can be communicated to the data storage 104 through the network 108. In some implementations, data storage 104 is accessed by data quality monitoring system 110 (e.g., to monitor data quality) directly and/or via enterprise computing system 102.

The data quality monitoring system 110 may be used to monitor, track, diagnose, triage, and/or generate insights related to data quality and/or generate data quality alerts by processing data from enterprise computing system 102 and/or data storage 104. The data quality monitoring system 110 can receive a data stream from the enterprise computing system 102 and identify the data stream as input data to be processed by the data quality monitoring system 110. The data quality monitoring system 110 generates output data by applying data quality monitoring processes to the input data and communicates the output data to an output destination. In some implementations, an output destination is one or more of enterprise computing system 102, data storage 104, and/or user device 106. In some implementations, an output destination is data quality monitoring system 110 itself (e.g., stored until accessed by a request from an enterprise or user device).

In some implementations, data quality monitoring system 110 performs data observability monitoring. Data observability monitoring can include monitoring metadata about data managed by enterprise computing system 102. For example, one or more processes for data observability monitoring can be performed on data to determine if particular data still exists, if there have been any adverse changes to the schema of the particular data, if the particular data has been updated recently, and/or if the volume of data in the particular data is consistent with expectations. A process for data observability monitoring can be performed without querying the data itself, but rather by querying metadata. For example, for a table the metadata needed for observability monitoring can include statistics such as: last updated time, number of rows (or size in bytes), column name, and/or column type. In some implementations, the metadata is captured at regular intervals so that a change over time of the metadata can be monitored and/or reported.

In some implementations, data quality monitoring system 110 performs data quality monitoring. Data quality monitoring can include monitoring data content for anomalies that can affect the quality of the data. For example, data quality monitoring can monitor value in a data table over time for anomalies. This stands in contrast to some data observability monitoring practices that monitor metadata about the table, but that would otherwise miss anomalies reflected in the values of the data within the table. For example, a data observability monitoring process may report that a table is being updated on schedule and that the size of the table meets expectations, however the updates to the table could be incorrect data due to a data processing error in the enterprise's dataflow. Examples of issues that produce data quality problems that can be checked by a data quality monitoring process include broken data flows (e.g., data processing or orchestration tools can break down entirely, stopping or degrading the flow of data), scheduling errors (e.g., data processing jobs can run out of order or with the wrong cadence, causing missing data, incorrect computations, or duplicate data), propagation of poor data due to upstream data flow issues (e.g., input data fed into data processing operation can be of poor quality due to upstream issues, and the adverse effects can propagate throughout the rest of the warehouse), incorrect data processing steps (e.g., errors can be introduced into the SQL, Spark, or other code that is processing and manipulating the data, causing invalid joins, transformations, or aggregations), incorrect settings (e.g., engineers can make mistakes in the configuration of complex data processing jobs), failed software updates (e.g., attempts to upgrade code, application versions, or entire subsystems can introduce subtle but pervasive differences in how data is encoded or transformed), and/or inconsistent logic (e.g., new features or functionality can be communicated poorly to other affected teams, leading to inconsistencies in data processing logic that create quality issues).

In some implementations, data quality monitoring system 110 generates alerts (reports) indicating data quality issues. For example, the alert can be directed to and output by a user device to notify a user (e.g., a data engineer of the enterprise) that a data quality issue has been detected. In some implementations, data quality monitoring system 110 generates an alert if a data quality issue exceeds an alert threshold. The alert threshold can be dynamic and based on historical data. A dynamic threshold can be used in order to avoid or minimize generating too many alerts (e.g., false positives, leading to the likelihood that alerts will be ignored by a user) or too few alerts (e.g., false negatives, leading to significant anomalies that a user is not made aware of).

In some implementations, data quality monitoring operations of data quality monitoring system 110 are automated using one or more machine learning approaches. Examples of machine learning approaches include unsupervised or supervised machine learning. Typically, data quality monitoring system 110 will use unsupervised machine learning instead of supervised machine learning (e.g., which relies on data labeled by humans). In unsupervised learning, the model does not require human labels and operates on the data, with all of that data's inherent patterns and relationships. The model learns from the data itself and interprets new inputs based on everything it has seen so far. Given that data can differ greatly from table to table or company to company, it can be difficult to collect enough labeled data to use supervised machine learning for data quality monitoring. Thus, unsupervised learning can be a better fit for monitoring data quality if sufficient labeled data is not available or practicable. An unsupervised machine learning model that works well can begin monitoring a dataset without extensive initial setup and continue to learn and adapt as the data changes.

The user device 106, the data quality monitoring system 110, or both, can provide a user interface for the data quality monitoring system 110. Aspects of the user interface can be rendered on a display (e.g., of enterprise computing system 102 or user device 106) (e.g., the display 1750 in FIG. 17) or otherwise presented to a user. The user interface may be generated by a data quality monitoring application that interacts with (or is a component of) the data quality monitoring system 110. The data quality monitoring application can be deployed as software that includes application programming interfaces (APIs), graphical user interfaces (GUIs), and other modules.

In some implementations, a data quality monitoring application can be deployed as a file, executable code, or another type of machine-readable instructions executed on the enterprise computer system 102, data storage 104, and/or user device 106. The data quality monitoring application, when executed, may render GUIs for display to a user (e.g., on a touchscreen, a monitor, or other graphical interface device), and the user can interact with the data quality monitoring application through the GUIs. Certain functionality of the data quality monitoring application may be performed on the user device 106 (and/or enterprise computer system 102) or may invoke the APIs, which can access functionality of the data quality monitoring system 110. The data quality monitoring application may be rendered and/or executed within another application (e.g., as a plugin or a web application in a web browser), as a standalone application, or otherwise. In some implementations, a data quality monitoring application may be deployed as an installed application on a workstation, as an "app" on a tablet or smartphone, as a cloud-based application that accesses functionality running on one or more remote servers, or otherwise.

In some implementations, the data quality monitoring system 110 is a standalone computer system that includes only a single computer node. For instance, the data quality monitoring system 110 can be deployed on the user device 106, enterprise computer system 102, or another computer device in the computing environment 100. For example, the data quality monitoring system 110 can be implemented on a laptop or workstation.

In some implementations, the data quality monitoring system 110 is deployed on a distributed computer system that includes multiple computer nodes (e.g., enterprise computer system 102). For instance, the data quality monitoring system 110 can be deployed on a server cluster, on a cloud-based "serverless" computer system, or another type of distributed computer system. One or more computer nodes of the distributed computer system may communicate with the user device 106, for example, through a data quality monitoring application that provides a user interface as described above. In some implementations, the one or more computer nodes are distinct computer devices in the computing environment 100. In some implementations, the one or more computer nodes can communicate with each other using TCP/IP protocols or other types of network communication protocols transmitted over a network (e.g., the network 108 shown in FIG. 1) or another type of data connection.

In some implementations, the data quality monitoring system 110 is implemented by software installed on private enterprise servers, a private enterprise computing device, or other types of enterprise computing infrastructure (e.g., one or more computer systems owned and operated by corporate entities, government agencies, other types of enterprises) (e.g., enterprise computer system 102). In such implementations, some or all of the enterprise computing system 102, data storage 104, and the user device 106 can be or include the enterprise's own computer resources, and the network 108 can be or include a private data connection (e.g., an enterprise network or VPN). In some implementations, the data quality monitoring system 110 and the user device 106 (and potentially other elements of the computer environment 100) operate behind a common firewall or other network security system.

In some implementations, the data quality monitoring system 110 is implemented by software running on a cloud-based computing system that provides a cloud hosting service. For example, the data quality monitoring system 110 may be deployed as a SaaS system running on the cloud-based computing system. For example, the cloud-based computing system may operate through Amazon® Web Service (AWS) Cloud, Microsoft Azure Cloud, Google Cloud, DNA Nexus, or another third-party cloud. In such implementations, some or all of the enterprise computing system 102, data storage 104, and the user device 106 can interact with the cloud-based computing system through APIs, and the network 108 can be or include a public data connection (e.g., the Internet). In some implementations, the data quality monitoring system 110 and the user device 106 (and potentially other elements of the computer environment

100) operate behind different firewalls, and communication between them can be encrypted or otherwise secured by appropriate protocols (e.g., using public key infrastructure or otherwise).

Figure 2:
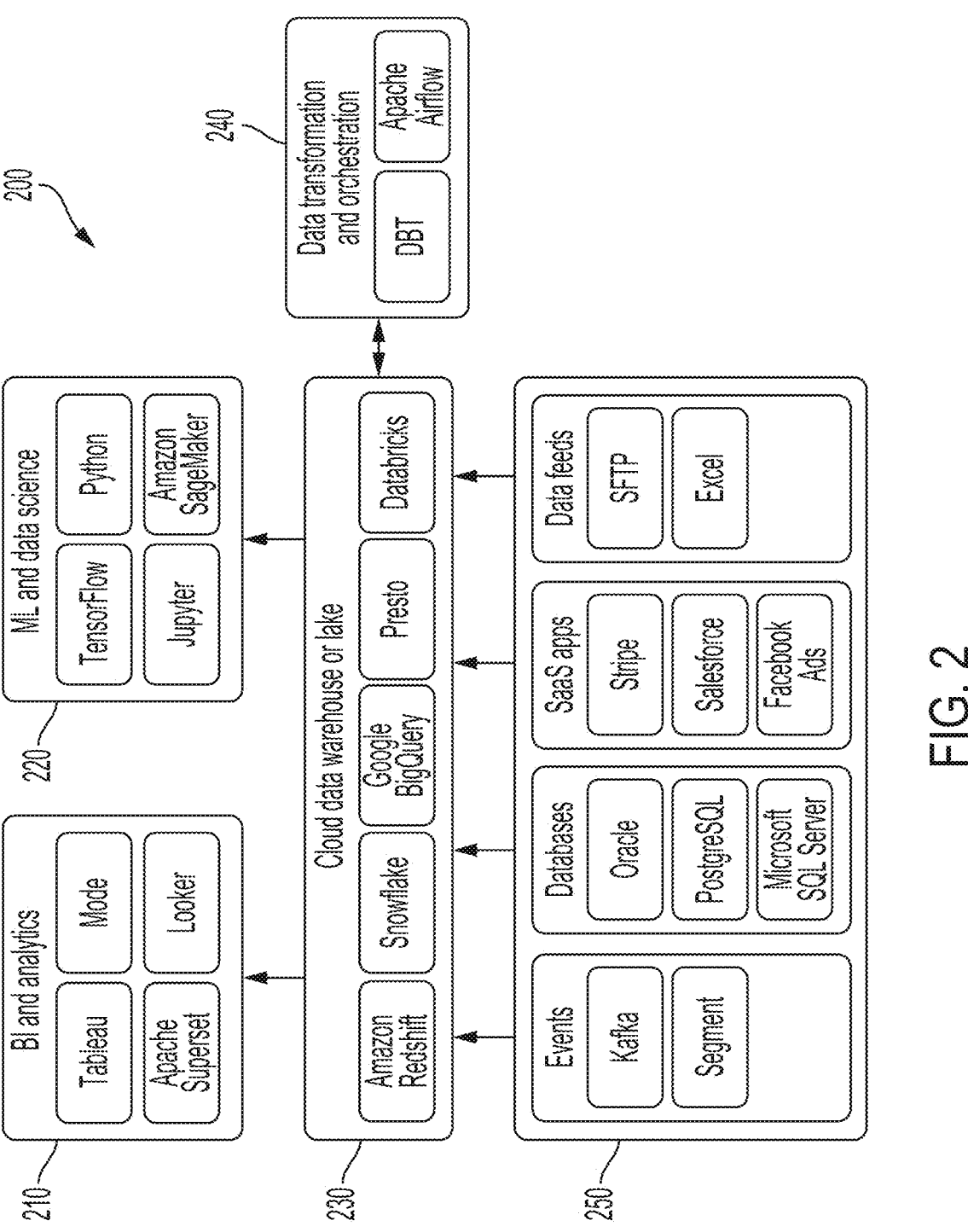
FIG. 2 is a block diagram showing an example data stack.

FIG. 2 illustrates an example modern data stack. A modern data stack is a major investment. This investment is undermined when tools for data quality are left out (as in FIG. 2). For example, because migrations can be a major source of data quality issues, organizations often end up with data that's in a bad state post-upgrade. Tracing the root cause of problems can be even harder in a brand-new system where everyone is learning the system. Diagram 200 of FIG. 2 illustrates the following components: BI (business intelligence) and analytics component 210 (e.g., services such as Tableau, Mode, Apache Superset, or Looker), ML (machine learning) and data science component 220 (e.g., services such as TensorFlow, Python, Jupyter, or Amazon Sage-Maker), cloud data warehouse or lake component 230 (e.g., services such as Amazon Redshift, Snowflake, Google Big-Query, Presto, or Databricks), data transformation and orchestration component 240 (e.g., services such as dbt or Apache Airflow), and source data component 250 (e.g., including sources of data generated by a user, an organization, or a producer or consumer of data). In some embodiments, source data component 250 includes events data (e.g., services such as Kafka or Segment), databases (e.g., services such as Oracle, PostgreSQL, or Microsoft SQL Server), Saas (software-as-a-service) applications (e.g., services such as Stripe, Salesforce, or Facebook Ads), and data feeds (e.g., via secure file transfer protocol (SFTP) or Excel).

Figure 3:
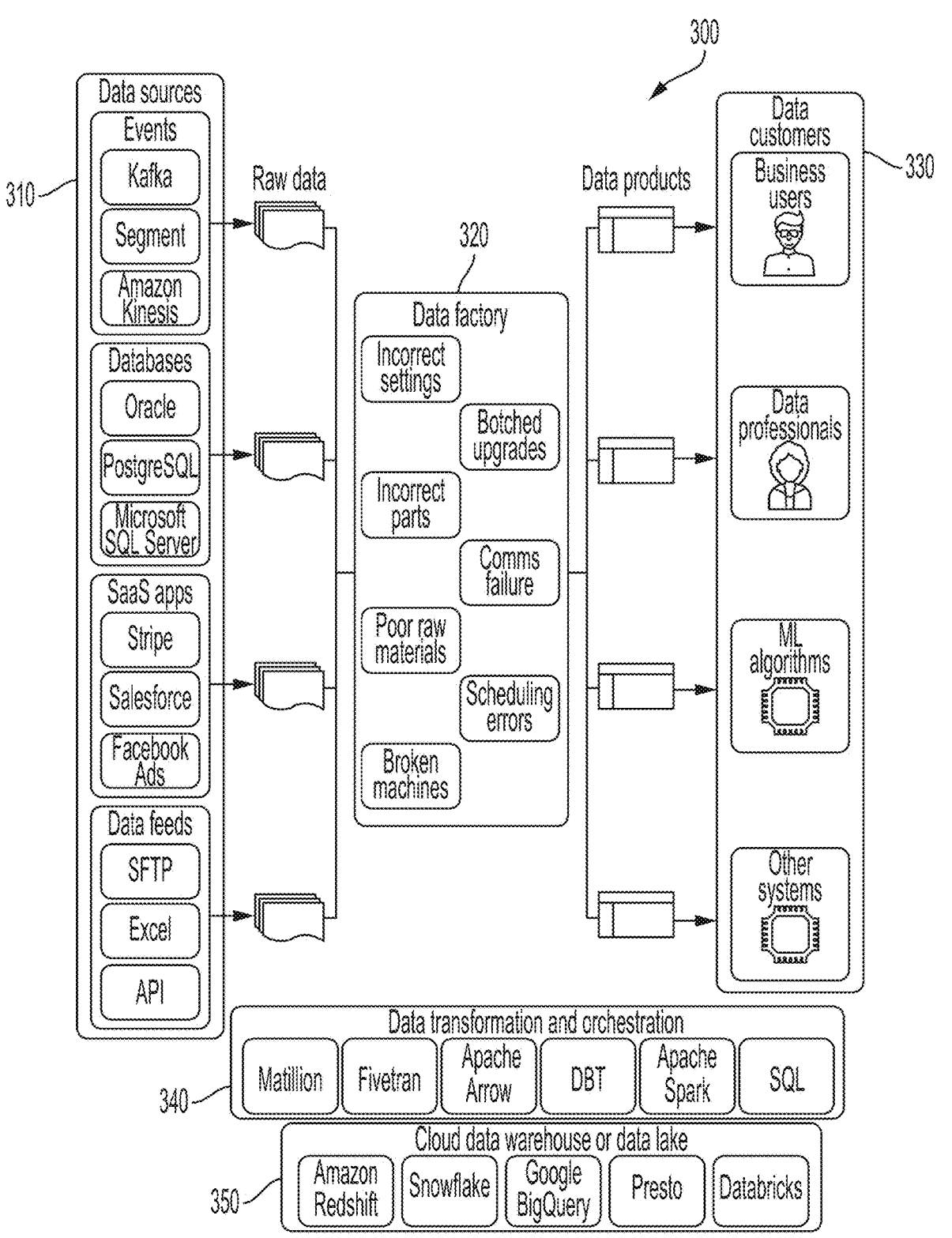
FIG. 3 is a block diagram showing an example data factory.

FIG. 3 illustrates an example data factory. Traditionally, the warehouse has been the metaphor of choice for how data systems operate inside a company, emphasizing the storage and transportation of goods. But with the rise of the modern data stack, and the new ways companies are working with data, that metaphor is no longer complete. Instead, companies today are operating what more closely resembles a data factory: a complex environment that serves to transform raw materials into useful products. Diagram 300 of FIG. 3 illustrates the following components: data sources component 310 (e.g., similar to data source component 250 of FIG. 2), data factory 320, data customers 330 (e.g., consumers of the output of the data factory), data transformation and orchestration component 340 (e.g., similar to data transformation and orchestration component 240 of FIG. 2), and cloud data warehouse or data lake component 350 (e.g., similar to cloud data warehouse or lake component 230 of FIG. 2). In the example of FIG. 2, data factory 320 represents events, occurrences, or operations (e.g., driven by users, ingested data, or data transformation and orchestration components) that affect data.

Instead of steel, rubber, and electronics, a data factory can ingest streaming datasets, replicas of databases, API extracts from SaaS apps, and raw files from data feeds. The factory is built on a foundation, but instead of cement, the foundation here is the cloud data warehouses and data lakes. For example, the machines that are operated on the factory floor, in this case, are extract, transform, and load (ETL) tools (e.g., like Matillion and Fivetran), orchestration platforms (e.g., like Apache Airflow), and transformations (e.g., happening in dbt, Apache Spark, and SQL). The folks on the floor operating the machines are the data engineers and analytics engineers of the modern data team. And the products produced, instead of consumer or industrial goods, are curated data products that power the decisions made by business users and data professionals, the training and prediction of ML algorithms, and the direct feeds that pipe into other data systems.

FIG. 3 illustrates the data factory and what can go wrong on the factory floor. For example, such problems can include one or more of: broken machines (e.g., data processing or orchestration tools can break down entirely, stopping or degrading the flow of data), scheduling errors (e.g., data processing jobs can run out of order or with the wrong cadence, causing missing data, incorrect computations, or duplicate data), poor raw materials (e.g., raw data fed into the factory can be of poor quality due to upstream issues, and the adverse effects can propagate throughout the rest of the warehouse), e.g., incorrect parts (e.g., errors can be introduced into the SQL, Spark, or other code that is processing and manipulating the data, causing invalid joins, transformations, or aggregations), incorrect settings (e.g., engineers can make mistakes in the configuration of complex data processing jobs, which can lead to a wide variety of issues), botched upgrades (e.g., attempts to upgrade code, application versions, or entire subsystems can introduce subtle but pervasive differences in how data is encoded or transformed), communication failures (e.g., well-intentioned changes to add new features or functionality can be communicated poorly to other affected teams, leading to inconsistencies in data processing logic that create quality issues).

Issues inside the data factory are often the most common sources of data quality incidents, as they directly affect the flow and contents of the data (and can be very difficult to test outside of a production data environment).

There are several reasons data quality monitoring can be needed and several ways to think about approaching data quality monitoring. With the ever-increasing importance of high-quality data, and the fact that data quality problems are more prolific than ever, it is important to consider how one should think about such an initiative. For example, on approach is to consider it as a one-time fix-getting your data into shape over a period of months or quarters, and letting things run smoothly from there. This kind of approach often makes sense for software, but much less so for data. For example, code is the same today as it is tomorrow, barring a deliberate update. You can test it in a controlled quality assurance (QA) environment and also run unit tests that isolate just one part of the system. Once your tests pass, you are essentially done. Data, on the other hand, is chaotic and constantly changing. It is dependent on external factors you do not necessarily control, such as how users interact with your product in real time, so you may only be able to test it holistically in production. As an example, such tests should be able to filter out all the noise—and there is typically a lot of noise—from the true data quality signal. While software bugs are often quickly detected and fixed through automated testing and user feedback, the vast majority of data quality issues may never be caught if teams lack the right continuous monitoring tools for data. Rather, problems may happen silently and go unnoticed.

Making matters worse, the cost of fixing a data quality issue can increase dramatically the more time has passed since the issue occurred for one or more reasons: the number of potential changes that could have caused the issue goes up linearly with the length of time over which are being evaluated; the amount of context the team has on why a change was made, or what the implications of that change could be, goes down with the time since the change; the cost to "fix" the issue (including backfilling the data) goes up with the amount of time since the issue was first introduced; and issues that persist for long periods of time end up becoming "normal behavior" to other downstream systems, so fixing them may cause new incidents.

When an incident is introduced and then fixed later, it really has two different types of impact. These are referred to as data scars and data shocks.

After an incident happens, unless the data is painstakingly repaired (which is often impossible or expensive to do), it will leave a scar in the data (data scar). A scar is a period of time for a given set of data where a subset of records are invalid or anomalous and cannot be trusted by any systems operating on those records in the future.

Data scars can impact ML models, as those models will have to adapt to learn different relationships in the data during the period of the scar. This can weaken their performance and limit their ability to learn from all the data captured during the scar. It can also dampen the model's belief in the importance of the features affected by the scar—the model may underweight these inputs, wrongly believing they're less prevalent in the dataset. Even if the scar is repaired, data leakage may be introduced into downstream ML applications by inadvertently including some current state information in the repair. This can lead to the model performing very well in offline evaluations (since it has access to "time-traveled" information from the future) but acting erratically in production (where it no longer has this information).

Data scars can also greatly impact any future analytics or data science work done on this dataset. They may lead to more complex data pipelines that are harder to write and maintain, as data users have to add a lot of exception handling to avoid biases introduced by the scar. These exceptions may need to be noted and addressed in any reporting or visualizations that include data from the time of the scar, increasing cognitive overhead on anyone trying to interpret the data or make decisions from it. Or, scars may need to be removed entirely from the dataset, leading to "data amnesia" from that period, which can affect trend analysis or time-based comparisons (e.g., what was the year-over-year result for this statistic?).

In addition to the scarring effect, there are also effects in production that occur both when the data quality issue was introduced and when the data issue is fixed. This is referred to as a data quality shock or data shock, and it can also affect AI/ML and decision making. When the data quality issue first occurs, any ML models that use features derived from the data will suddenly be presented with data that is entirely different from what they were trained on. This can cause them to be "shocked" by the new data, and they will produce predictions that are often wildly inaccurate for any observations affected by the data quality incident. This shock can last until the models are retrained using new data, which often happens automatically in a continuous deployment model. Then, once the data quality is fixed, that actually introduces yet another shock to the model (unless the data is repaired historically, which often isn't possible). The shock from the fix can often be as bad as the initial shock from the introduction of the data quality issue.

For analytics/reporting use cases, these shocks often manifest as metrics or analyses that have sudden unexpected changes. When these are observed, they are often mistaken for real-world changes (the whole purpose of these reports is to reflect what's happening in reality), so operations are changed or other decisions are made to respond to the data quality issue as though it were real. Again, the same thing can happen in reverse when the fix is released.

Generally, the longer the data quality issue goes unfixed, the deeper the scar, and the greater the shock from fixing it.

The implication of allowing scars and shocks to continue accumulating is that slowly, over time, the objective quality of the data erodes. And as hard as it is to backfill data, it's even harder to backfill trust in the data.

Attention is now directed to automated data quality monitoring. Generally, data quality is something that needs to be monitored constantly and maintained diligently by fixing problems as soon as they arise. Effective data quality monitoring is no easy task-especially at the scale of thousands of tables and billions of records, which is common for a large enterprise. Generally, it does not work to have humans manually inspect your data nor to use legacy solutions like writing tests for data and tracking key metrics. For example, such approaches may be used for the most important tables of data, but implementing it for an entire data warehouse simply generally is not feasible.

Described here is the concept of automating data quality monitoring with unsupervised ML. This is a new technique that can have many benefits. For example, it can require hardly any manual setup and can scale easily across a data warehouse. For example, with the right implementation, it can automatically learn the appropriate thresholds for whether a data change is big enough to signal a quality issue. For example, it can detect a broad range of problems, including unknown unknowns that no one has ever thought to write a test for.

Using ML comes with its own challenges. Building the model is a complicated task on its own, but an operator should also ensure it works on a wide variety of real-world data without over- or under-alerting. Additionally, an operator may want to build out notifications that help its team effectively triage issues, and integrations with a data toolkit that bring data quality front and center for their organization. Finally, the operator may need to have a plan in place to deploy and manage the monitoring platform in the long term.

There are many different ways data quality monitoring can be approached. Before evaluating the options, it helps to think about what success looks like. Below, the description includes a discussion on example requirements for successful data quality monitoring and walks through some traditional strategies—manual checks, rule-based testing, and metrics monitoring—to determine how they measure up. After that, automating data quality monitoring is described. For example, such description includes examples of how unsupervised machine learning can help satisfy some missing aspects of our success criteria, scaling monitoring to large amounts of data while reducing alert fatigue. The approaches described here may have many advantages, such as allowing subject matter experts (SMEs) to enforce essential constraints and track key performance indicators (KPIs) for important tables while providing a base level of monitoring for a large volume of diverse data without the need for server farms or legions of data analysts.

Attention is now directed to example requirements for successful data quality monitoring. To address a vast array of problems, a successful data quality monitoring strategy can ideally deliver across four dimensions. First, it can detect quality issues in all important data so that an operator can be confident no issues are slipping through the cracks-whether they appear at the level of tables, columns, or individual rows. Second, it can alert the right people in a timely manner when there is a real issue, without causing alert fatigue by notifying people about nonissues. Third, it can help resolve issues quickly and efficiently. Fourth, and finally, it can scale to monitor the health of data enterprise-wide.

Alert fatigue may be overlooked but can be important to successful data quality monitoring. When a data quality monitoring solution fails to alert on a real issue, this is called a false negative. When a solution triggers an alert when it shouldn't have—for an issue that users do not care about or that is not really a problem at all—this is called a false positive. A system with many false positives is arguably just as problematic as a system with many false negatives because it will bombard users with unhelpful alerts, leading to the undesirable condition of alert fatigue. This is when users become so tired of responding to false alarms that they begin to ignore notifications from the system or, worse, disable notifications entirely. Data quality monitoring systems can be particularly susceptible to the effects of alert fatigue, and it's one of the most common reasons that adoption of a monitoring system fails.

Attention is now directed to some traditional approaches to data quality. Some teams may find it relatively easy to implement data observability for their entire warehouse but struggle when it comes to scaling their data quality monitoring. Historically, the most common ways that teams have approached data quality monitoring are through manual detection, rule-based testing, and metrics monitoring. While we present these strategies separately here, organizations often employ a mix of all three at once. There is value in each of these strategies, but also significant drawbacks at scale.

Attention is now directed to manual data quality detection. Since the invention of digital data, it's been increasingly difficult for humans to comb through data by hand and find potential issues. At some businesses, there's an intentional process of manual data quality review, whether in the form of spot-checking, reviewing summaries, or looking at visualizations. This generally isn't sufficient for monitoring data quality. Manual inspection might work when the data is small and simple enough that a human can look at a spreadsheet and quickly spot potential issues (notably, various studies report that nearly 90% of spreadsheets contain errors). But it's generally not effective at scale. Furthermore, a manual process is inherently subjective. Give the same complex dataset to 10 different analysts, and you'll likely get a large number of divergent conclusions about the quality of the data they are evaluating.

Manual data quality detection also generally happens in a very different way: by accident. Someone is in the midst of doing something with the data, and they "stumble upon" a data quality issue. Here are a few examples: computing summary statistics and comparing these to known figures or other reference data points (e.g., a data scientist might find that the number of customers is 50% higher in an aggregated dataset than in another known source, indicating there must be a data quality issue); creating visualizations that summarize the data in ways that make it clear that there are data quality issues (e.g., a visualization of missing values over time may show a very sharp increase in recent weeks); reaching conclusions from an analysis, or from interrogating models, that suggest things that are provably untrue (e.g., an analyst might find that growth in new accounts exceeded 1,000% per week in Europe for the last three weeks, and yet there is no possible way that could happen) (e.g., an ML model might suggest that the most important feature in predicting user churn is a user's date of birth—but on closer inspection, this is due to a large fraction of users being born on Jan. 1, 1970, which is the beginning of the Unix epoch, therefore indicating bad data).

Relying on analysts and data scientists to discover data quality issues as they work is not a winning strategy either.

Practitioners may examine the data only periodically, and with a very specific purpose in mind. They will most likely catch data quality issues long after they've occurred and will almost certainly miss data quality issues that are outside the scope of their project. This kind of resolve-as-you-go approach can be quite detrimental. In some organizations, more than 50% of analysts' time is dedicated to investigating and working around data quality issues. Not only does this manual work cut the team's effectiveness in half, but over time it takes a huge toll on morale.

All this being said, analysts and data scientists invariably want visibility into the data they work with, and depending on the situation, a manual review can add value. Humans are capable of bringing together disparate data sources and contextual knowledge and drawing conclusions in ways that algorithms may be unable to automate.

Ultimately, whatever monitoring approach chosen should reduce manual effort and make it possible to monitor data at scale. However, such approach ideally still makes it easy for humans to profile their data and spot issues manually (for example, by producing summary statistics and visualizations).

Attention is now directed to rule-based testing. Generally, when testing software, engineers write unit tests that invoke components, measure the actions taken, and apply deterministic rules to those measurements to validate that the software is working as expected. For example, an ecommerce application might have a method for computing the tax rate. A unit test could supply this method with various baskets of goods and store locations and ensure that it produces the right answer. It's natural to try to take what works for testing software—writing lots of unit tests—and apply that to data. This approach is referred to as rule-based testing. Common tools for rule-based testing can include Great Expectations and dbt. A rule-based test is a deterministic test that can be applied to data from a specific source. The data either passes the test or fails the test; there is no gray area in between.

Rules can be an essential part of any data quality monitoring strategy. Compared to human analysis, rules can be cheap to run and don't make mistakes. Rules are also clear and deterministic. Each row either passes or doesn't. For instance, understanding the rule means understanding why the rule-based test would fail, and what would need to be true in order for the test to pass for that row. When a rule-based test fails, one can trust that it truly failed (e.g., there will not be a false positive where the data was good but the rule said it was bad, unless the rule itself is incorrect).

Additionally, rules are one of the most reliable ways to identify historical data quality issues that have existed from the beginning of a dataset or were never caught and addressed historically. For instance, this can be true because rules allow an expert to express a requirement that they have for a given dataset, based on their knowledge of the system that generated the data or the business context in which the data was collected. For example, an expert can write a rule saying that a column should never be NULL in the data's past, present, or future. Contrast this with approaches that learn from the history of the data (such as using metrics or unsupervised ML to detect unexpected changes) looking for sudden changes in the data, which are new issues rather than historical data quality issues. Such approaches would not be expected to tell if the data was always bad.

Rules are also good at identifying the needle in the haystack. If working with a table that has billions of rows, then a rule is often a reliable way to spot if there are a handful of records that violate a given condition. Note that this can be a liability if you don't care about each and every record, as you'll have to find ways to exclude data quality "scars" from the past that you no longer care about but that violate your rule.

Relying solely on rule-based testing, however, is generally a mistake. For one thing, there's a lot of room for error in specifying high-quality rules. For example, the scope can be too narrowly specified (e.g., too tight a "WHERE" SQL clause), causing the rule to miss data quality issues (e.g., the rule was only applied to segment X of a table, but it should also apply to segment Y). For example, the scope can be too widely specified (e.g., too expansive a "WHERE" SQL clause), causing the rule to incorrectly flag valid data as invalid (e.g., this column actually should be NULL for certain records). For example, the constraint of the rule can be incorrectly specified. This is generally common when setting ranges for column values or for statistics: the range may be too wide (and thus miss real data quality issues), or too narrow (and thus be very noisy as data changes). For example, the wrong type of rule may be selected. A test with the wrong rule may either fail to capture the real intent of the user or produce notifications that are not meaningful because the test was inappropriate (the column was always intended to have NULL values, but a "never NULL" rule was applied anyway).

Furthermore, covering all of a modern enterprise's data with high-quality rules may ultimately be an impossible task. Consider the following realistic hypothetical example, where an organization has 10,000 tables to monitor for data quality issues: 10 tables are mission-critical fact tables that the entire company depends on (key statistics aggregated for the board come from these tables); 90 tables contain critical data used to make business and operational decisions on a daily basis across the company; 900 tables are of critical importance to individual teams or initiatives, used by product managers, ML engineers, analysts, data scientists, or other data-savvy professionals on a weekly basis; and the remaining 9,000 tables could have data quality issues that manifest in subtle, difficult-to-detect ways in the other 1,000 tables.

Each of these tables might have tens, hundreds, or even thousands of columns. For example, fact tables often aggregate a wide variety of information about a given type of entity into a single very broad table that launches many analyses and use cases. Some tables can also have hundreds or thousands of segments (groups of rows) that have different behavior. Web event tables, for instance, often capture a large volume of structured data (e.g., device, IP address, URL, user, time, etc.) and semistructured data (e.g., JSON payloads) for hundreds or thousands of different events or actions that users can take.

Each column or segment of data for each table might require 5 to 10 rules to cover the most important constraints on that data. Thus, to monitor their most important tables with rule-based testing in this example, an organization could end up writing 1,000 tables*50 columns per table*5 rules per column=250,000 rules. Notably, these 250,000 rules wouldn't cover semistructured data, segment variation, or the other 9,000 potentially important tables.

In addition to creating rule-based tests, they have to be maintained, which is generally more difficult than maintaining unit tests. A unit test for code should produce the same result every time it's run, until there's a software update that breaks the expected behavior, intentionally or unintentionally. But unlike code, data changes constantly and in unpredictable ways—as new products are launched, the macroenvironment shifts, or user behavior changes, to name a few reasons. Therefore, rule-based tests can be very brittle. To ensure that their definitions—and particularly their constraints—remain accurate, rules need to be constantly updated as the product and data evolve. It can be tempting to save some time by loosening the constraints up front, but this risks missing real issues.

In summary, rule-based testing is not a scalable sole solution to monitoring data in a modern enterprise. However, rules are a powerful tool for experts to express and enforce their expectations of the data from first principles.

Attention is now directed to metrics monitoring. This data quality monitoring approach is also inspired by software engineering. Most software systems are monitored by tracking metrics about the infrastructure and notifying when there are sudden adverse changes. These stats could be about the hardware itself (e.g., CPU utilization, memory, etc.), the networking activities (e.g., packets lost, etc.), or individual services that are running (e.g., queue length, average latency, etc.). Analogously, one can monitor statistics about data and set thresholds to tell the system to alert if the data spikes above or below expectations. The challenge is that, for data quality, the surface area of metrics to monitor explodes. For example, to ensure proper coverage, metrics may be needed for every column, segment, and statistic that an operator might care about-such as percentage of NULL values, percentage of duplicates, mean, min/max, etc.

Beyond the scalability issues, metrics monitoring for data quality can present other problems. For example, because it tests the data at the aggregate statistical level, it may miss data quality issues that affect only a small percentage of the records. Furthermore, some implementations of metrics monitoring do not identify the specific records that were responsible for the metric changing-making it hard to understand why metrics changed and whether the reason was valid (such as an external trend) or due to a data quality issue.

Metrics monitoring can also miss issues that creep into the data over time. For example, imagine the source of a data quality issue is a code change that's behind a feature flag. If the feature is slowly rolled out to customer segments, the data will change gradually. As a result, any change to the metrics may also be slow and might never reach the threshold for an alert.

That said, metrics monitoring can be important when wanting to pay close attention to a very specific slice of the data. Important metrics are often heavily influenced by a small subset of the overall dataset, and any trends therein might not be caught by other monitoring methods that consider the data as a whole.

Similarly, metrics monitoring can help when the data is degraded for some expected percentage of records, but the user wants to avoid that percentage going up in a significant way. For example, it could be that 20% of the time, user records don't have a valid address because of how those user records are created. If that percentage were to increase significantly, then there might be a data quality issue that has corrupted or removed address information for a larger number of users than expected.

Given these potential benefits and drawbacks, a successful data quality monitoring strategy should let users set up monitoring on key metrics and, ideally, use time series models to set appropriate thresholds. But it's generally not sufficient to rely on metrics monitoring alone.

Attention is now directed to automating data quality monitoring with unsupervised machine learning. Having covered the traditional (and nonautomated) approaches to monitoring, a new strategy is described below: unsupervised machine learning. ML algorithms can allow for greater efficiency, speed, and consistency than traditional, manual approaches. Unsupervised ML is described below, along with the role it can plays in automating data quality monitoring at scale.

A threshold concern is to address what unsupervised machine learning is. Broadly, an ML algorithm can be categorized as either supervised or unsupervised. In supervised learning, the data that the model uses to learn is labeled by humans. Image classifiers often use supervised learning—a human shows a model thousands of images labeled as a tree, a cat, and so on, and the model then learns to recognize similar objects in new images. In unsupervised learning, the model does not have human labels—it just has the data, with all of that data's inherent patterns and relationships. The model learns from the data itself and interprets new inputs based on everything it has seen so far.

As a general principle, supervised learning does not make practical sense as a strategy for data monitoring, as it can require humans to collect and label a large, diverse set of training data representing real-world data quality issues the model needs to reliably detect. Given how data differs wildly from table to table, not to mention from company to company, it would be onerous to collect enough labeled data to make supervised ML work well. This makes unsupervised learning the better fit for monitoring data quality. For example, after developing an unsupervised ML model that works well, it can begin monitoring a dataset without any initial setup and continue to learn and adapt as the data changes. These algorithms can be tuned to detect deep, complex issues in the data, such as: the percentage of NULL values in a set of columns has increased; a specific segment of data (e.g., one country) has disappeared or is arriving with fewer records than expected; the distribution in a column changed significantly (e.g., the credit score distribution is skewing much higher than expected); or the relationship between multiple columns has changed (e.g., these columns used to sum to equal one another, but now no longer do for a subset of records).

A potential advantage of unsupervised ML is that it aims to understand changes in the relationships of data in the table as a whole. This can be important because data in a table is usually highly interrelated.

When monitoring data for data quality, users often oversimplify things and consider just the values, distribution, or summary statistics in columns individually and create rules or metrics to monitor the column in isolation. But in practice, real-world data can have complex correlation structure. This complex correlation between data can have two significant implications for monitoring. First, if every column of a dataset is monitored in isolation with metrics or validation rules, then the monitors will also be very highly correlated. If the column correlations are causally linked to some data or process, then a change in that underlying mechanism may cause many dependent metrics to change, and validations to fail simultaneously. So, instead of getting one alert, we may well get dozens or more. Second, if each column is evaluated for data quality in isolation, a significant amount of contextual information may be disregard that could be important for data quality. For example, in a data set of credit card data, the phi-K correlations between columns can be determined. If evaluation of the credit card data suddenly found that 'balance age' and 'limit balance' fields were less correlated (based on phi-K correlation), then this could signal a risk that one of the two columns has experienced a sudden data quality shock.

In order to leverage the rich structure of real-world datasets, avoid sending many alerts for correlated issues, and successfully automate data quality monitoring at scale, an approach to monitoring is needed that can operate on the data arriving in a table as a whole rather than upon each column in isolation. Unsupervised ML algorithms can excel at doing this. For example, compared to more narrowly scoped metrics or validation rules, a good unsupervised ML model will find a wider range of data quality issues, including unknown unknowns that humans didn't think to check for. It can also automatically suppress repeated anomalies—for example, on the second day that an issue recurs it can use the first day as a "new normal" baseline. Further, issues that affect multiple columns can be clustered together and presented as a single issue—for instance, they can be detected in one pass with the unsupervised algorithm and allocated to the appropriate columns and rows accordingly.

It should be noted that one or more of the techniques described here can involve or be used with a broad array of data processing techniques or algorithms (e.g., unsupervised ML, supervised ML, or semisupervised ML). Accordingly, references to data processing or an ML model, without more, do not necessarily refer to techniques based on unsupervised learning.

Attention is now directed to types of data that can be subject to data quality monitoring.

Structured, relational data (also referred to simply a structured data) is often the most important type of data to monitor, as it's the form factor most often consumed by analytics platforms, ML models, and other data products. While it may not be a large percentage of the total volume of data an organization amasses, it can make up a disproportionate amount of the valuable data. Within this category, there are three kinds of structured data that should be considered for monitoring: normalized relational data, fact tables, and summary tables. Each are described below in turn.

In the context of data quality monitoring, normalized relational data can be considered as data distributed among multiple tables that all relate to one another. For example, each table will have a primary key and data that's uniquely associated with that primary key; each table may also have multiple foreign keys that can be used to join to other tables.

Normalized relational data is very common in production applications. It's an efficient way to store data when reading or writing to databases in an OLTP (Online Transactional Processing) mode, where each application interaction will generate DB (database) reads and writes associated with it. Many data warehouses will copy normalized data directly into the data warehouse as a raw "replica" of the data being stored in the production application. In such examples, this data is then transformed into fact tables or summary data—the "data factory" work (e.g., described with respect to FIG. 2 above) that converts data into a more usable form for dashboards and other data products.

Data quality monitoring can and should be directly applied to normalized relational data, as this data is often at the "root" of issues that will appear downstream. However, this data may present only a limited surface for monitoring because each table is narrow and self-contained. To truly understand the scope and context of issues, data monitoring solutions should join to other tables in the relational model-which is expensive if done at query time.

To overcome the analytical challenges of having to write every query as a complex join and aggregation of multiple normalized tables, many organizations create "fact" tables, which denormalize data into a single materialized table. For example, an ecommerce company might have a "fact_orders" table, where each row represents an order from a customer on their website. In addition to timestamps and identifiers associated with that specific order, it might also summarize information from other tables: information about the actions the customer took leading up to the order (e.g., from a web/mobile events table); information about the customer who placed the order (e.g., joined from a customer table); information about the items purchased in the order (e.g., joined from an items table); and timestamps associated with the fulfillment, cancellation, or other processing of the order (e.g., joined from order processing event tables).

These fact tables are often the most insightful to monitor for data quality issues. Fact tables can take very finely grained information, which might otherwise be spread across tens or hundreds of tables, and roll it up into an entity with real business value. They are also often purpose-built and maintained to be a consolidated basis for other analytics, ML, and product teams to consume. As a result, issues visible at this level are usually important ones; they can be uncovered by a mix of unsupervised ML monitoring, rule-based testing, and metric monitoring. Fact tables can also provide a great deal of context about each record in the table, which can help with understanding issues when they do occur.

Summary tables are aggregations of relational data or fact tables, often used to power dashboards and reports. For example, an ecommerce company might have a customer summary table that presents the latest statistics for each customer, like their number of orders, satisfaction rating, and expected lifetime value. Or a financial services company might maintain a daily aggregate of financial performance and risk information for key business segments that is used in generating financial reports. These tables are important to monitor for data quality issues, as they can be foundational for reporting applications. One characteristic is that summary tables will often show only the most recent information for each entity they are summarizing over. As such, data monitoring solutions would ideally need to take snapshots of these tables in order to detect issues that arise over time.

Machine learning is a statistical approach that, compared to rule-based testing and metrics monitoring, can have many advantages: scalability, ability to detect unknown-unknown changes, and ability to learn from prior inputs, use contextual information to minimize false positives, and understand target data better and better over time.

So far this description has explored when and how automation with ML makes sense for data quality monitoring strategy. Now discussion turns to exploring core mechanism: how an operator can train, develop, and use a model to detect data quality issues and even to explain aspects like their severity and where they occur in your data.

Attention now turns to exploring a machine learning approach that works well for data quality monitoring and an algorithm (e.g., series of steps) an operator can follow to implement this approach.

There are many ML techniques an operator could potentially apply to a given problem. To figure out the right approach for a use case, it's helpful to define the requirements upfront. A model for data quality monitoring ideally has four characteristics: sensitivity, specificity, transparency, and scalability.

Sensitivity is a measure of how well an ML model can detect true positives. To be effective, an algorithm should be able to detect a wide variety of data quality issues in real-world tabular data. For example, a good benchmark is being able to detect changes that affect 1% or more of records.

The counterpart to sensitivity, specificity tells you how good the model is at not triggering false positive alerts.

Sensitivity can be important in data quality monitoring, where alert fatigue can threaten the adoption and efficacy of the entire approach. Generally, a monitoring system tends to over-alert for a few reasons. One reason can be seasonality—if there are patterns in the data that repeat daily, weekly, or annually, the data might look like it's changing, but it's not really changing in an unusual or unexpected way. Another reason for over-alerting is if monitoring isn't able to cluster correlated columns that are affected by the same data change. Yet another reason a monitoring system sends false-positive alerts is if it reviews too small a sample of data or evaluates the data over too small a time window. Additionally, there are some datasets that are much more "chaotic" than other datasets, and so the threshold for how sensitive a check should be needs to be calibrated to each dataset (and may need to evolve over time).

With respect to transparency, when issues arise, the model should be transparent and help users understand and root cause issues. One might think that this does not have to do with the model itself—for example, if visualizations and root-cause analysis happen after a data issue is detected. However, options can depend on the ML approach used. For example, a model's architecture and implementation can dictate how much a user will be able to explain and attribute its predictions. For instance, some ML features might help improve accuracy but will be difficult to explain to users in the context of data quality.

With respect to scalability, to run daily on potentially billions of rows in a data warehouse, a monitoring system should be able to scale—in human, storage, and computational cost. Ideally it requires no up-front configuration or retuning by administrators to run, as this would just create another form of handwritten rules, which has been shown not to be a scalable solution. Ideally, it should have a minimal query footprint on the data warehouse and be capable of executing quickly on inexpensive hardware outside of the warehouse.

Wrapping up discussion of requirements for a data quality monitoring model, it's worth taking a moment to address a common confusion: the difference between outlier detection and data quality monitoring.

Outlier detection can be a useful way of understanding complex datasets. There are many ways to identify outliers, but one scalable and flexible approaches is to use a variant of random forest called Isolation Forest to identify rows of data that are far from the "center" of a multivariate distribution.

Outlier detection can be accomplished with ML, and it seeks to find out about unusual aspects of the data. But the similarities with data quality monitoring stop there. After all, every dataset will have unusual observations-even a normal distribution has extreme values. These outliers may be interesting (they could be fraudulent records or just very rare events or data combinations), but they aren't necessarily going to be data quality issues, which can affect common or rare records with equal probability.

In contrast, for example, to identify data quality issues, it's helpful to know when there is a sudden structural change in the distribution of data arriving into the table. For instance, quality monitoring wants to know if, in the past, records always appeared with a certain distribution, pattern, or relationship, and now, all of a sudden, that has changed in a significant way. On the other hand, every dataset likely has outliers. Outlier detection is solving a fundamentally different problem.

Attention is now directed to a discussion of an example ML approach and algorithm. Now that example characteristics or requirements have been covered, the description below relates to a possible approach and the steps for implementing it. This is merely intended as an example—other approaches for using ML to detect data quality issues may be possible and consistent with the description here. Generally, the success of an implementation that relies on ML will be affected by implementation details. For example, things like feature engineering and parameter (e.g., ML model hyperparameter) tuning/dampening can make the difference between an effective implementation and one that over- or under-alerts on real-world data.

Recall that it is desirable to develop an ML model to detect unexpected changes in data, without any humans labeling the data and telling us what constitutes a data quality issue. This makes this type of ML problem an unsupervised learning task. However, there does happen to be a feature of the data that we can use as if it were a human label, and that is the time when the data arrived into the table. This is one potential insight used in this proposed approach. This can be implemented thusly: every day, a snapshot of the data is taken. Then, every day, the approach involves trying to train a classifier to predict whether the data is from today or not. For example, if there's nothing statistically remarkable about the data from today, then the attempt to train a classifier should fail-predicting whether the data is from today or not should be an impossible task, basically a flip of a coin.

On the other hand, if a classifier can be built that predicts with some accuracy whether a piece of data came from today, it can provide a level of assurance that something is unusual about the data from today. And, further, this can indicate it is unusual in a meaningful way—because a few random changes in a couple of records aren't likely to be enough to train a model to make a prediction one way or another. In practice, this method can provide the ability to say how significant the change is and set appropriate thresholds to avoid alert fatigue. By explaining the model's predictions, once can explain what is most likely going on inside the data.

The ML approach and model described here is described as unsupervised. This term conveys that a model is attempting to identify which dates have anomalies in a given table without relying on explicit human labels of anomalous dates. However, some might disagree with this classification. For instance, each dataset used to train the model may technically be considered to have a label (e.g., the date), even if that label is not human generated, and so this could be considered a supervised model/process. Further, as described in more detail below, a model can be fine-tuned by introducing anomalies that are explicitly labeled, so there's an argument to be made for the term semisupervised as well. The particular term used is not necessarily dispositive.

Moving past the main idea, attention is directed to the each of the following steps in more detail: data sampling (e.g., how do you build a dataset to train your model and what is an appropriate sample size?); feature encoding (e.g., how do you go from a row in one of your tables to a set of features that your model can use to make predictions?); model development (e.g., what is the right model architecture for this algorithm and how should you train the model?); and model explainability (e.g., once you've trained a model, how do you use it to explain a data quality issue?).

With respect to data sampling, the starting point for building any model is generally to create a training dataset by sampling from an overall pool of data. For the algorithm described above, a training dataset should have a robust set of randomly sampled data from both "today" (label=1 for the class we are trying to predict) and "not today" (label=0). The "not today" data should be a mix of prior time comparison periods: yesterday (or the last time you got a data update) for sudden changes, as well as other times of the week or year to control for seasonality.

For instance, an example dataset can include 150 k to 250 k rows of data per day. A robust sample might include 10,000 rows from each of the following dates: 2021 Jan. 16 (today, the date you want to assess for data quality issues), 2021 Jan. 15 (yesterday, which will help identify any sudden changes), 2021 Jan. 9 (one week ago, to control for day-of-week seasonality), and 2021 Jan. 2 (two weeks ago, in case last week had anomalies).

With respect to sample size, an algorithm such as this may need at least 100 records per day to have a chance of finding meaningful changes in reasonably complex data. But that begs the question—what is the upper limit of the number of records that is useful for the algorithm?

A sampling rate can be chosen to balance computational cost versus accuracy. For example, the proposed algorithm has been run against datasets that have as many as tens of billions of rows added per day. In practice, and based on rigorous testing, findings indicate that 10,000 records per day (if randomly sampled) can provide enough data to capture most data quality issues, even those affecting as little as 1-5% of records. In some cases, quality improvement decays as sample sizes exceed 100,000.

Large sample sizes (say, 1,000,000 records per day) can be used, but the computational cost may not be worth the value. A dataset would need to be very, very stable (little background chaos), and the change would need to be in a very small percentage of records (say, 0.1% of records), for this increase in sample size to be worthwhile.

It can seem like a mistake to sample a fixed sample size (e.g., 10,000 records), rather than to sample, say, 10% of the data. After all, if a dataset has 1 billion records, how can 10,000 still be representative of that huge population? However, perhaps counterintuitively, because the sample is chosen entirely at random, its accuracy doesn't depend on the total size of the data, just on the absolute sample size. For example, consider estimating the average income of a country. If a first country's population is 100 million, and a second country's population is 1 million, does that mean more people from the first country must be sampled to get an estimate of the average income? No. In both cases, a sample of 1,000 people can be taken and provide a very good estimate of the average income.

When sampling data, it is important that the sample be taken at random from the table. For example, if there is any bias in the sampling, then the algorithm will be able to find that bias and will represent it as a false positive change in the data that will confuse users. It is also important to ensure that the sampling is as efficient as possible. In practice, getting random records out of the data warehouse for the machine learning model is often the most expensive operation in this kind of a system. That is because the table may have billions or even trillions of records in it, and hundreds or thousands of columns. If a query naively required reading every record into memory or sending it over a network in order to sample, this would be disastrous for performance and incur a great deal of data warehouse costs.

Attention is now directed to feature encoding. ML models aren't typically trained on raw data, but rather they learn using numerical features, which are transformations of the raw data into signals the model can use. How the raw data is transformed can have a significant impact on the performance of the model and typically requires both expertise in ML and subject matter expertise in the data and problem at hand. This process, called feature engineering, can be fully automated.

An example of how this works is as follows: each record in the sample will have a number of columns, and each column could be an integer, float, string, Boolean, date or timestamp, or complex type like JSON or an array. An automated process can walk through each column (expanding complex types like JSON into subcolumns if necessary), extract information that could be interesting to the selected model, and encode this information into a floating point matrix of ML features.

An operator implementing this monitoring system will want to develop a library of candidate encoder types to apply, based on the features that they believe could indicate whether the data has changed in a meaningful way. For example, the following recommended encoders can be used: Numeric (e.g., converts Boolean, integer, and floating values into floats); Frequency (e.g., how often each value appears in the sample of data); IsNull (e.g., a binary indicator for whether the column is NULL); TimeDelta (e.g., seconds between a time and when the record was created); Second-OfDay (e.g., the time of day the record was created); and OneHot (e.g., a one-hot encoder, which lets you map feature values (like categories or frequent integer values) to a binary yes or no indicator variable for each unique value in the column). Care should be taken with how complex to make encoders, because these encodings will need to be used to explain the data quality issue to a user.

With respect to developing the model to meet the scalability requirements and work in a practical setting, a model architecture is needed that is fast at inference and training, can be trained on relatively small samples, and will generalize to any kind of tabular data (when properly feature-encoded). In some embodiments, a gradient-boosted decision tree is used. For example, gradient-boosted decision trees work well for this use case, and libraries like XGBoost readily available for model development. In some embodiments, one or more machine learning algorithm other than a gradient-boosted decision tree is used.

Gradient-boosted decision trees work in an iterative fashion by building a sequence of decision trees on the dataset, where each tree (or "step") is designed to correct the mistakes of all of the trees that came before it. Ultimately, the model's prediction takes into account the results from all the trees that were trained at each step (this is known as an ensemble model). Helpfully, gradient-boosted decision trees have a very small number of parameters (hyperparameters) that really matter for tuning (mainly, the learning rate and the complexity of each tree, though there are others) and can be trained on datasets with thousands or even millions of records very quickly.

Some alternate approaches, such as linear models, are too simple to learn the complex patterns in most structured datasets. Other approaches, like neural networks, are often too complex for problems like this and require extremely large volumes of heterogeneous data to become very powerful (as in image and language models).

Attention is now directed to training and evaluating a selected algorithm. In theory, gradient-boosted decision trees could continue iterating and iterating endlessly, so the number of steps should be capped at some limit. To do this, it is recommended that the model's performance is evaluated after each step. For example, this can be done by selecting a random portion of the data to use as a holdout set for evaluation (and not training) and test the model after each iteration. The model's performance will be an indication of whether there is something anomalous about today's data.

Typically, there are three model performance patterns (scenarios) that tend to show up in practice. The first scenario, "No anomaly," is when there is little progress made on the training data and the performance on the test data begins getting worse very quickly. This means that there is unlikely to be any anomaly in the new data.

The second scenario, "Incomplete," happens when the model doesn't have enough time to converge. The process reaches a maximum number of trees (set to prevent the model from running indefinitely) and yet still shows that the training error and test error are declining. In these instances, either more trees should be added or, preferably, the learning rate should be increased, which causes the gradient boosting algorithm to take larger "steps" in the direction of each tree that it evaluates.

The third scenario, "Optimal," occurs when the model makes good progress on training and test, until a point where the test loss begins increasing. This indicates that the process can stop where the test loss was at its minimum. At that point, the model will have learned as much about what differentiates these two datasets as it can, given the other parameters of the learning algorithm.

In practice, in order to provide consistently interpretable model statistics and explainability results, a balance needs to be made between optimizing a model for a single dataset and building a model that generalizes to many datasets across different periods of time.

Turning now to the consideration of computational efficiency, many organizations have important tables that can include billions of records. Examples include: transactional data from financial services industries, raw event data from high-traffic applications or websites, digital advertising impression and event-level data, physical sensor data, and messaging information from social platforms. With data at this scale, it's easy to create a monitoring strategy that will be cost-prohibitive, or simply fail to successfully run even with modern data warehouses.

By placing a limit on the number of records that are sampled per day, most of the computation and memory usage in the model will scale linearly with the number of columns added. For example, searching for the best split while expanding a decision tree at each node will increase linearly with the number of columns you need to search over. Although typical tables have 10-50 columns, it's common for tables to have 200 columns, and some tables have thousands. Furthermore, tables may have JSON data that you'll need to automatically expand into new synthetic columns, which can lead to tables with 10,000 columns in some situations.

The following optimizations can make an algorithm more computationally efficient. First, ensure that the process is only querying for one day of data at a time and snapshot results as much as possible to build history. Note that this comes at a cost, as algorithms will have less history to work with on day one and won't be as effective in a "cold start" scenario. Second, randomly sample records from the table using the data warehouse (using the efficient techniques noted earlier) and compute more complex profiling or ML results on the random samples. Third, if using gradient boosting decision trees, limit the depth and total number of trees (data quality checks are not typically looking for very complex interactions) and early stop if test error increases significantly during the training process. Fourth, optimize the learning process itself, which, depending on the computing platform and learning algorithm used, could include steps like using sparse encodings, distributing learning via multiprocessing, or utilizing GPUs.

If you have a model that performs well on the test set, this indicates that you've found a potential data quality issue. The next step is to explain what the model has found. Model explainability can be key for several reasons. First, explainability can tell a user how anomalous the data from today is. This can allow a user to perform many kinds of tuning to avoid alert fatigue. For those issues where the data quality monitoring system sends an alert, knowing the severity can help end users prioritize their response. Second, explainability can tell a user where in the data that anomaly is located. This can allow pointing investigators to the right segments of the data and create all kinds of interesting root cause analysis aids, like samples of bad data.

An example of providing model explainability is now described, which involves deriving a score that credits how much each individual {row, column} cell in the dataset contributed to the model's prediction. There are several approaches to do this. For instance, one technique is to use SHAP (SHapley Additive explanations), which essentially approximate a local linear estimation of what the algorithm is doing for each cell in the dataset.

To illustrate how this works in practice, suppose that a user wants to detect data quality issues in a table of credit card transaction data and have sampled 10,000 records from yesterday and today, has encoded the features, and built a model predicting on which day each record arrived. The following four records will be followed through the SHAP explainability process:

| Amount | Type | FICO score | Brand | Type | Credit limit | Source |
|---|---|---|---|---|---|---|
| $ 18 | Swipe | 684 | Discover | Debit | $12,564 | Today |
| $ 59 | Chip | 578 | Mastercard | Credit | $ 7,600 | Today |
| −$445 | Chip | 689 | Visa | Credit | $ 6,700 | Yesterday |
| $137 | Chip | 734 | Mastercard | Credit | $ 7,100 | Yesterday |

In this case, two records are from yesterday and two records are from today. (Recall in the examples above that the source column is not used to make predictions about which day the data arrived on; rather, it is the response that we are training the model to predict.)

Then, suppose that a model is used to make predictions for each row for which day we think it is likely to have arrived on:

| Amount | Type | FICO score | Brand | Type | Credit limit | Source | Predicted Pr( Today ) |
|---|---|---|---|---|---|---|---|
| $ 18 | Swipe | 684 | Discover | Debit | $12,564 | Today | 51% |
| $ 59 | Chip | 578 | Mastercard | Credit | $ 7,600 | Today | 78% |
| −$445 | Chip | 689 | Visa | Credit | $ 6,700 | Yesterday | 45% |
| $137 | Chip | 734 | Mastercard | Credit | $ 7,100 | Yesterday | 52% |

In this case, the applied model thinks there is a 78% chance that the second record is from today, whereas the other three records are within +5% of the 50% average prediction that would indicate the model has no strong bias for which day the data came from.

Rather than working directly with the predicted probability (which is hard to express as a linear relationship, given probabilities are naturally bounded between 0% and 100%), the probabilities can be converted into their log odds, using the formula log odds=ln [probability/(1−probability)]:

| Amount | Type | FICO score | Brand | Type | Credit limit | Source | Predicted Pr( Today ) | Log odds |
|---|---|---|---|---|---|---|---|---|
| $ 18 | Swipe | 684 | Discover | Debit | $12,564 | Today | 51% | 0.02 |
| $ 59 | Chip | 578 | Mastercard | Credit | $ 7,600 | Today | 78% | 0.55 |
| −$445 | Chip | 689 | Visa | Credit | $ 6,700 | Yesterday | 45% | −0.09 |
| $137 | Chip | 734 | Mastercard | Credit | $ 7,100 | Yesterday | 52% | 0.03 |

Then, the SHAP algorithm can be run, which will decompose these log odds statistics into a linear combination of contributions from each of the columns as used in the ML model (in reality, we would need to get the SHAP values at the feature level, and then aggregate those):

| Amount | Type | FICO score | Brand | Type | Credit limit | Predicted Pr( Today ) | Predicted Pr( Today ) | Log odds |
|---|---|---|---|---|---|---|---|---|
| 0.01 | 0.02 | 0.02 | −0.01 | 0.00 | −0.01 | Today | 51% | 0.02 |
| −0.03 | 0.01 | 0.41 | 0.19 | −0.01 | −0.03 | Today | 78% | 0.55 |
| 0.02 | −0.03 | −0.05 | 0.02 | −0.03 | −0.02 | Yesterday | 45% | −0.09 |
| 0.01 | −0.02 | −0.01 | 0.01 | 0.02 | 0.02 | Yesterday | 52% | 0.03 |

In this case, the findings show that the FICO SCORE and BRAND column values are contributing significantly to the model's prediction that the second record is from today. Examining the data values above, it can be seen that this corresponds to: FICO SCORE=578 and BRAND='Mastercard'.

This suggests that there may be something anomalous happening with the distribution of low credit scores for Mastercard transactions (though we are examining only a few records here—in practice, we would look at the SHAP values distribution summarized across all 10,000 records per day).

In some embodiments, the SHAP values are normalized and tuned. In some embodiments, the end result that is derived (e.g., by normalizing and tuning the SHAP values results) is referred to here as an "anomaly score." Importantly, this score can be aggregated and/or sliced to provide many different levels of granularity.

The anomaly score can be used in many ways to gain insight into a set of data along different dimensions. At the lowest level, the anomaly score can be looked at for each individual {row, column} cell in the sampled data. From here, the anomaly scores for a row can be aggregated to find the most anomalous entries, or aggregated by sets of rows to find anomalous segments. The average anomaly score can also be taken by column to find the most anomalous columns. The anomaly score can also be calculated for the entire table. Anomaly scores can also be clustered to find correlations across columns.

Knowing the anomaly score is not only important for data where there's been a significant change. By calculating the anomaly score for every record in the table, visualizations that put the anomaly in context can be created.

For example, human-readable categories can be assigned to anomaly scores to help with interpretation. One approach that works with a wide variety of datasets is to group anomaly scores into six different buckets (categories), from minimal to extreme. These categories can be based on the log of the overall anomaly score-every two buckets represents an order of magnitude increase in the score. The categories in this example are: Minimal (there is little to no significant change in the data), Weak (a small percentage of the data is affected by a change that requires explanation and careful study to detect), Moderate (a small percentage of the data is affected by an obvious change, or a moderate percentage is affected by a change that requires simple explanation), Strong (a significant percentage of the data is affected by an obvious change, or a majority of the data is affected by a change that is easily explained (though it may not be obvious at first glance)), Severe (a majority of the data is subject to a change that is obvious), and Extreme (there is a change that is obviously affecting almost the entirety of the data from today).

In some embodiments, the anomaly score for each table is used to learn a custom threshold for when to trigger an alert. For example, the data in some tables changes more frequently than in others, so using corresponding custom thresholds can prevent alert fatigue.

So far, this description has touched on how unsupervised ML can help detect sudden structural changes in data on an ongoing basis. However, the ML approach outlined here has two additional use cases that are discussed below.

The first is finding legacy data quality issues, which will appear as shocks and scars in the history of your data. This can be done by running the algorithm outlined here on a sequence of historical dates and investigating the anomalies that are found. This process, which is referred to as back-testing and described in more detail in this description, can be used to measure how effective models are. Potential complications can arise with this use case, however. The first is that issues may be found that are very difficult to explain. There are often changes that no one in the organization remembers, and validating whether they are concerning or not would require expensive and tedious detective work. The second complication is that a user may be expecting to find some issues that simply aren't there. This often happens when known data quality issues are fixed and a team backfills the data to repair the scar. Once that happens, the model should no longer be able to detect the issue in the history of the data.

The second additional use case involves comparing two samples of data from the same table (or from different tables with the same column schema) to find meaningful differences between them, instead of using unsupervised ML to compare data in the same table over time. In this case, the unsupervised ML algorithm is going to detect, and help explain, any significant distribution or relationship differences between the two sets of data. Because it uses sampling, this approach can be applied to massive tables, and even to tables that reside in different source warehouses or databases. This allows for the following kinds of applications: comparing raw data from a source database to cleansed and transformed data in the destination warehouse; comparing the data from the current version of your ETL pipeline with the data produced by a new proposed version; comparing a current sample of data to a sample from the distant past; and comparing data from different business segments, geographies, product categories, or marketing campaigns.

So far, this description has provided an algorithm for data quality monitoring with unsupervised machine learning. Without strategies to account for challenges like seasonality, time-based features, and correlations across columns, a model may over- or under-alert, sometimes dramatically. Beyond knowing the pitfalls to look out for, it is recommended to continuously evaluate a model against benchmark data to figure out where and how to improve. The description that follows explores methods for effective model testing, including developing a library to introduce data issues (synthetic data anomalies) into otherwise well-behaved data.

To make a model truly valuable rather than noisy, strategies are needed to overcome the challenges presented by data in the wild.

One such challenge presented by data is seasonality. Humans are very seasonal creatures that change behavior patterns by hour of the day and day of the week. Most data tends to be a reflection of human behavior or is affected by human behavior, and so these seasonality patterns appear in almost all data an organization cares about.

As noted, one approach relies on comparing data from today to data from yesterday. But because of seasonality, it turns out this approach may not be sufficient on its own. Only comparing between consecutive days might run into the issue that (for example) today is Monday and yesterday was Sunday, and many of the differences in the data are due to seasonality rather than data quality.

One possibility is if, instead, today's data was always compared against data from the same day the previous week (e.g., if today is Monday, look at last week's Monday). However, this may not avoid all the potential problems. First, if such a strategy only checks data from last week, it may not really know how long the data has had an issue—it could have been present for the entire past week, or just appeared today. Second, if there was a data quality issue last Monday and today's data is normal, today's data might look abnormal simply because it's different from what happened last Monday. Third, if last Monday was a holiday, it can similar make today's data appear abnormal.

Another possible approach, to control for these seasonality factors, is to sample data from multiple different times in the past (e.g., yesterday, two days ago, a week ago, two weeks ago, etc.). If today's data looks "normal" when compared to any of these prior dates, then today's data must not be unusual.

Another possible approach to combat seasonality is to generate a lot of metadata statistics automatically every time monitoring data is performed. Then, time series models can be used on that metadata over time to identify if features have a longer-term consistent seasonality trend to them and dampen those features down.

Another challenge presented by data is time-based features. One problem that is almost certainly to be encountered when deploying a naive ML algorithm in the real world: there is usually at least one column in a table that is directly correlated with time, such as a timestamp or an ID. As a result, it would be trivial to look at this column and know whether the data is from today or not. Before these time-correlated features soak up too much of our model's attention, they can be identified and removed from the sample dataset entirely.

One approach for removing these time-correlated features involves feature engineering for timestamps that takes the delta between each timestamp and the column used to partition the data by time. This generally removes the readily-apparent correlations (e.g., having 10 different time-stamps that are all correlated with time). However, there may be less readily-apparent time-correlated features that are difficult to deal with. Examples that we have encountered include: autoincrementing IDs (e.g., each new customer gets a slightly larger ID, so one can always identify records from "today" as those having larger customer IDs); string- or integer-based representations of date information (e.g., such as "day of month" or "day of week") that will always be changing; and version identifiers for applications or logging semantics, which may change erratically or frequently depending on how often the system is updated.

Some of these time-correlated features can be identified via simple summary statistics, such as checking whether a feature is always larger each day. Another technique for dealing with this includes building an additional version of a selected model using the complete dataset, looking for any features that are incredibly significant to this model's predictions consistently over time, and taking these features out of the dataset for the real model.

Another challenge presented by data is chaotic tables. Datasets can be very chaotic for a few reasons. There might be humans conducting ad hoc processes (like marketing campaigns) on an unpredictable schedule that meaningfully affects the data. Alternatively, the product or service generating the data might be immature and in the process of being changed very rapidly by an Agile engineering team. If how chaotic a table is not accounted for, the model will be expected treat all data equally and over-alert on chaotic tables while under-alerting on tables that are more stable.

Figure 4:
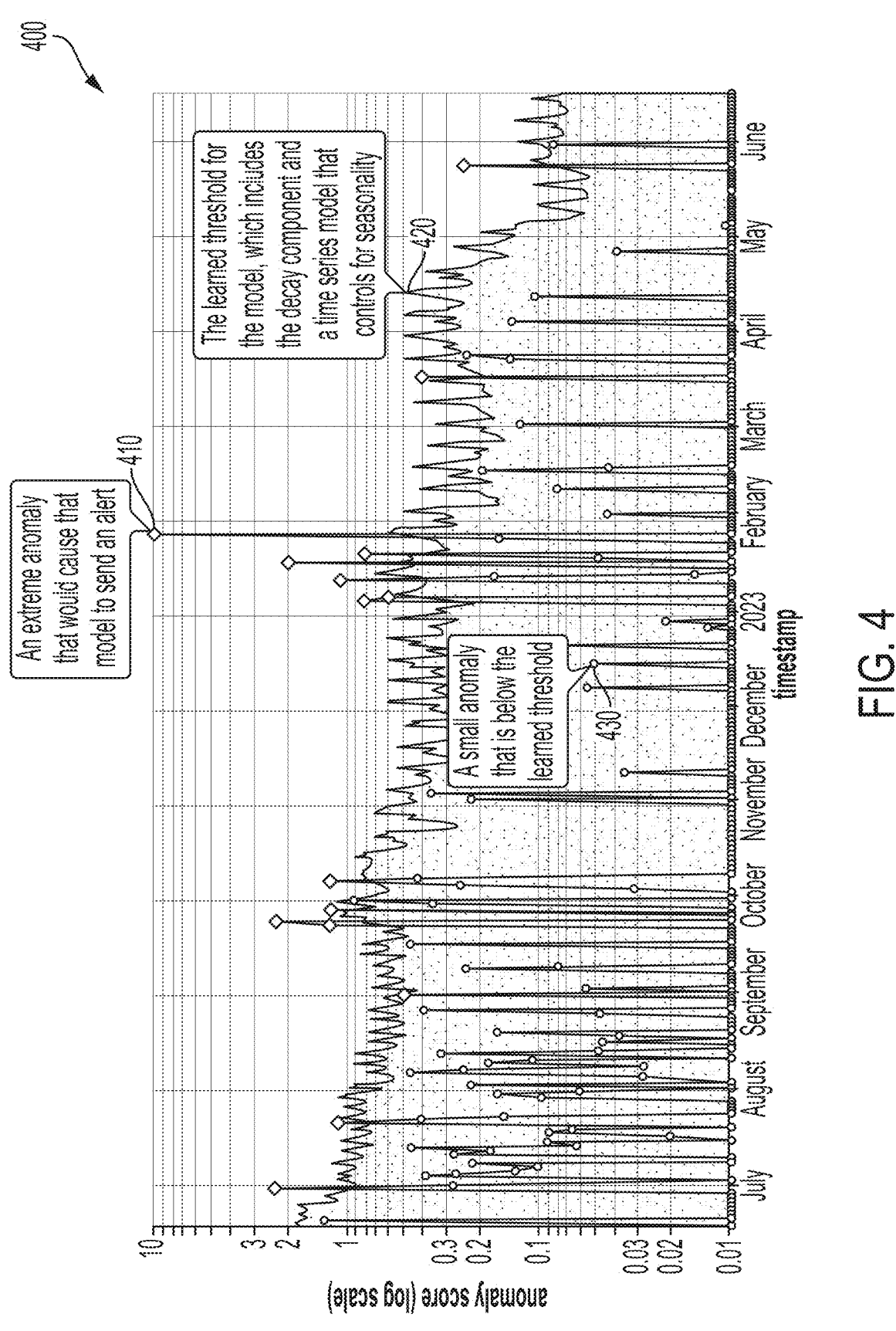
FIG. 4 illustrates an example of table anomaly scores and learned thresholds over time.

Therefore, it's important to set thresholds for notifications by building up a time series of the severity of changes detected by the ML model. FIG. 4 gives an example, where the overall anomaly score for the table (on a log scale) is based on the average magnitude of the SHAP values. In particular, FIG. 4 illustrates an example diagram 400 of table anomaly scores and learned thresholds over time. This allows a time series model to be used to learn how chaotic each table is and suggest a reasonable threshold for alerting that can move up and down dynamically over time.

To avoid noise when the model is first beginning to observe the data in the table, one recommendation is to start with a very conservative threshold and gradually reduce it to the level of chaos found in the dataset. For example, this can begin with a threshold that is very, very high (such that it is almost impossible for the model to alert on the initial run) and exponentially decay that baseline threshold down toward zero. A reasonable approach is to decay by a factor of two every 10 days or so. In such example, that base threshold can then be blended with a time series model that is fit to the scores the model has been logging. For example, diagram 400 of FIG. 4 includes threshold 420, which is a line that decays over time (note that the y-axis is a log scale). As can be seen anomaly score data point 430 falls below threshold 420 and would not likely cause an alert to be generated, while anomaly score data point 410 exceeds threshold 420 and may cause an alert to be generated.

Another challenge presented by data is updated-in-place tables. As noted above, an algorithm generally should not be expected to make decisions without some notion of time. This can be tricky in practice due to how some types of tables are updated.

Monitoring data can involve working with a few different types of tables in a data warehouse, including static tables, log tables, and updated-in-place (mutating) tables. Static tables are tables that don't have a time column. They can be either dimension or lookup tables (e.g., all of the demographic information known about a given entity) or summary tables (e.g., a set of summary statistics about the current state of a set of entities). Ideally, for static tables, snapshots of the data need to be taken every day because any record could be updated at any given time (or the entire table could be dropped and replaced). Log tables are tables where the only change that ever happens is that new records are added to the existing table. Thus, for log tables, no changes ever occur in old records. This is often the case with raw transactional or event-level data. Log tables usually have a "created_at" time column that indicates when each record was created, and that can be used to partition the data into time-based samples. Finally, updated-in-place (mutating) tables are tables that at first glance appear to be log tables, in that each record corresponds to a specific event or transaction, and new records are regularly being added to the table. However, in updated-in-place tables the records themselves can change after they are initially written. For example, a table of ecommerce orders might start without a record that has the order date, but the shipping date isn't known yet—it begins as NULL and is filled in over the coming days once the shipping date is set. Updated-in-place tables usually have a "created_at" time column, but they will also have an "updated_at" time column, which tracks when each record was last updated. These tables should be treated carefully.

Figure 5:
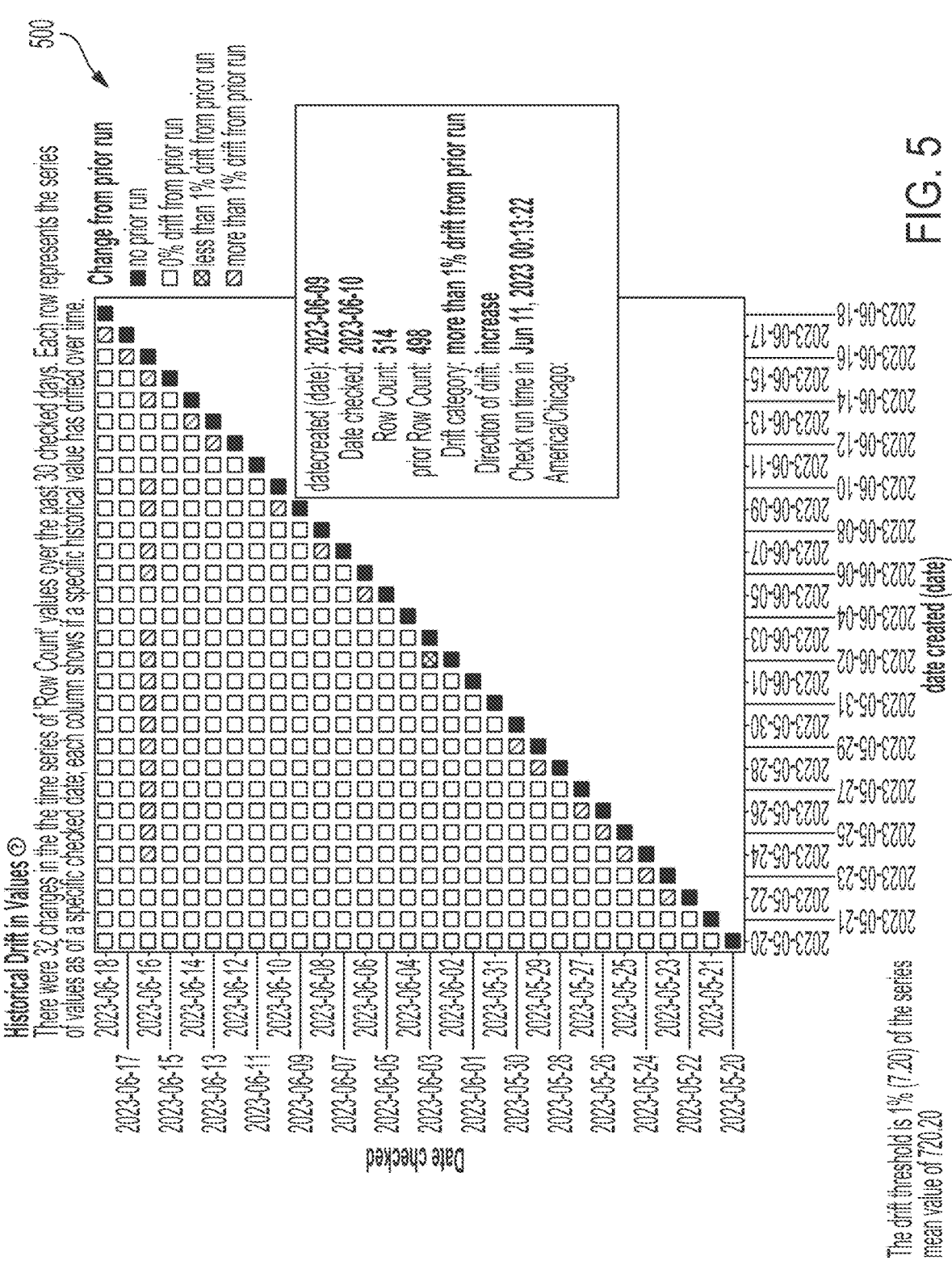
FIG. 5 illustrates example changes in row count over time for a table.

One way to detect if records in a table are frequently updated in place is to track how historical values in a metric change over time. FIG. 5 illustrates diagram 500 which depicts changes in row count over time for a table. For example, FIG. 5 records the number of records in a table each day. The x-axis is the time column in the table (the "datecreated" column), whereas the y-axis is the date. Each day, comparison can be done between the row count obtained on that day to and the count on the day prior. In FIG. 5, squares are colored (illustrated as shaded or hatched) based on whether, and how much, the data has changed.

For example, for 2023 Jun. 9 (per "datecreated"), when we first observed records on that date, we found only 498 rows. But the second day we checked (on 2023 Jun. 10), we found 514 rows. This indicates that more records were added on that subsequent date.

Two patterns are typically observed in a visualization like FIG. 5. In the first typical pattern, a diagonal pattern (e.g., of colored, shaded, or hatched squares) (e.g., diagonal pattern 610 of FIG. 6) means that a table has frequent updates to new data. Specifically, that new data is updated in the days immediately following its appearance in the table. The width of the diagonal indicates how long it takes for data to "mature" in the table. In FIG. 5, a diagonal is shown indicating that maturity takes about one day. In the second typical pattern, a horizontal line (e.g., of colored, shaded, or hatched squares) (e.g., horizontal pattern 620 of FIG. 6) indicates that, on a given date, a batch process was run that changed a bunch of historical data—often to address a data quality issue or otherwise migrate the dataset.

Figure 6:
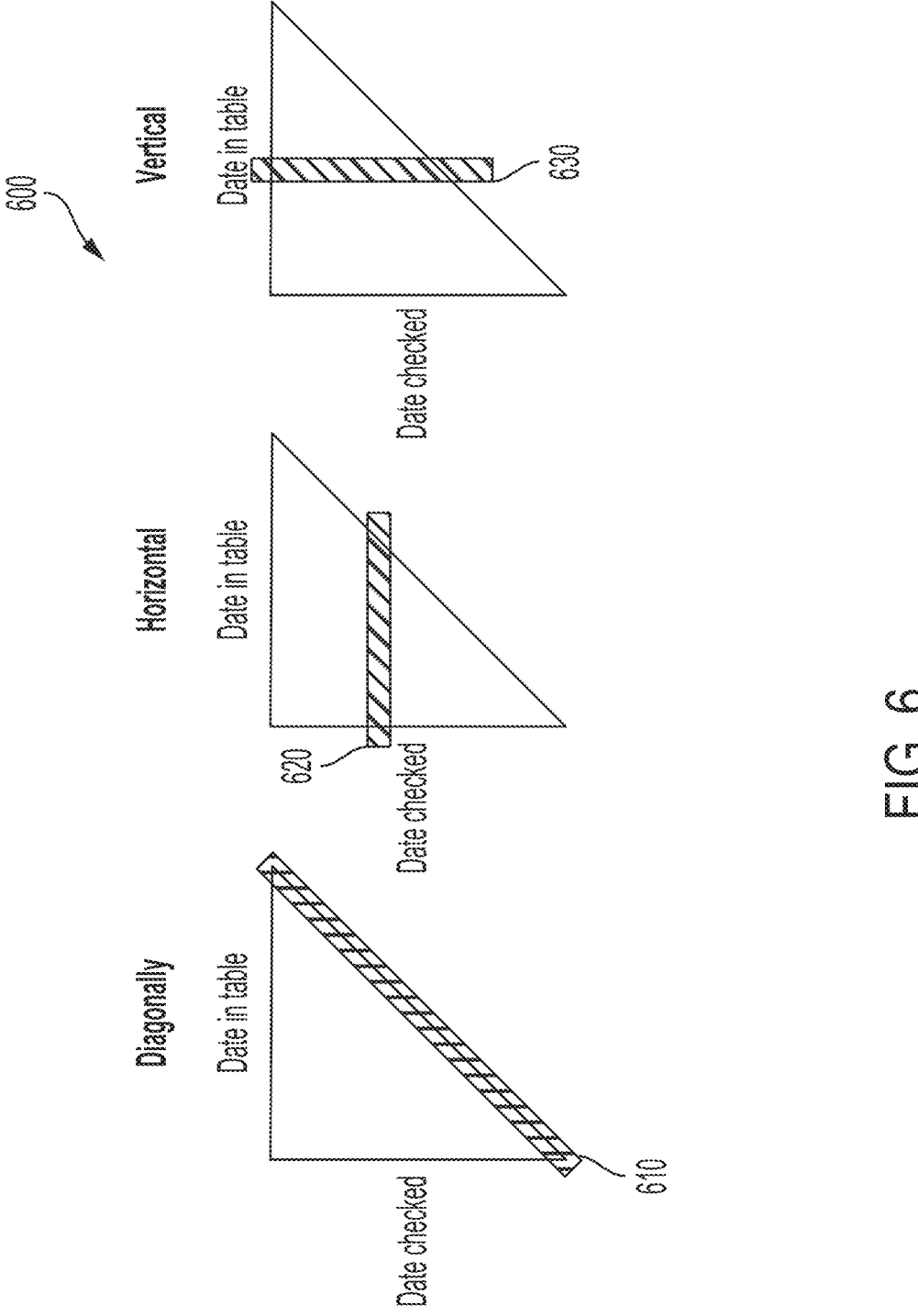
FIG. 6 illustrates example visual patterns to track how data changes over time in an updated-in-place table.

There's a third type of pattern, vertical lines of change (e.g., vertical pattern 630 of FIG. 6), but this is much less common, as it would indicate there is a specific date for which data is frequently changing. For visual examples of all three patterns, see FIG. 6. Diagram 600 of FIG. 6 illustrates visual patterns formed when using shaded or hatched squares, as in FIG. 5, to track how data changes over time in an updated-in-place table. In FIG. 6, the triangle (with a date checked side and a date in table (date created) side) that is overlaid by each pattern represents the data in diagram 500 of FIG. 5 (which forms such a triangle shape).

The problem with tables that are updated in place is that they appear to always have anomalies on the most recent date. For example, the percentage of orders with NULL shipping dates is always going to spike on recent days. However, this is really just a by-product of how data is being updated. If comparing the data from today to the data from yesterday when it was observed yesterday, then we would see that the percentage of NULL values in the "shipped_at" column is actually as expected.

For this reason, a data checking process can take snapshots of the data in each monitored table every day and compare the current data to these snapshots so that any changes that might be due to updated-in-place dynamics can be ruled out. Since it can be challenging to know which tables are updated in place (e.g., many tables will be updated in place without an "updated_at" time column), it's best to assume this is happening—and spend some extra computational resources—than risk sending repeated false positive alerts due to this issue.

Note that it can be hard to achieve a "warm start" with this approach, as you have to wait to take the snapshots of the data before you can trust that the algorithm isn't finding issues related to updated-in-place dynamics.

Another challenge presented by data is column correlations. Most datasets have a great deal of correlation structure in them. This can happen for several reasons. The same data may be captured in multiple different forms (e.g., identifiers and strings). Or there may be a hierarchy of identifiers that are all captured on the same table and used to group the data for different levels of business reporting. Also, tables often represent causal funnels where certain events must occur before other events can happen, and these funnels will appear as correlations in the table structure.

When columns are correlated, that means a single data quality issue could affect all those columns. If the algorithm isn't careful, it might send multiple alerts or suggest that there are many separate issues when in fact they are all related. Data quality issues affecting multiple columns often occur in pipelines where data "fans out." For example, we might start out with a column that is an integer ID for the location of an event. Then that column is joined to a locations table with metadata like location names, dates, priority levels, etc. If the original location identifier in the log goes missing, then the join will fail, and all of the other location metadata will also go missing.

One approach for addressing this is using SHAP values. With SHAP values that credit how anomalous individual values are in the table, row-level correlations can be used to cluster the columns together and present them as a single issue to the user. For example, if one level in a hierarchy is affected by a data quality issue, we will see anomalies across multiple columns, but all for the same rows. With this insight, a data quality checking process can present a single anomaly rather than overwhelming users with multiple alerts about the same incident.

As an example, consider the following table, which gives some sample product data for items stocked on grocery store shelves:

| Item ID | Department | Aisle | Product | Brand | Item | Size |
|---|---|---|---|---|---|---|
| 43112 | Refrigerated | Yogurt | Greek Yogurt | Chobani | 0% Plain | 32 oz. |
| 43113 | Refrigerated | Yogurt | Greek Yogurt | Chobani | 0% Plain | 64 oz. |
| 43114 | Refrigerated | Yogurt | Greek Yogurt | Chobani | 2% Plain | 32 oz. |
| 43115 | Refrigerated | Yogurt | Greek Yogurt | Chobani | 2% Plain | 64 oz. |
| . . . | . . . | . . . | . . . | . . . | . . . | . . . |
| 43945 | Refrigerated | Yogurt | Greek Yogurt | Fage | 0% Plain | 32 oz. |
| . . . | . . . | . . . | . . . | . . . | . . . | . . . |

In a dataset like this, an anomaly might occur at the product level (all Greek Yogurt is missing), which could be caught by features derived from the "Aisle" column (Yogurt is anomalous), "Product" column (Greek Yogurt), or "Brand" column (a collection of specific brands are anomalous). "Department" is probably too highly aggregated to be sensitive to an anomaly for Greek yogurt, and the "Item" column is too fragmented to be easily used to detect the anomaly.

Given an algorithm that has produced the SHAP-based anomaly scores for each individual record, clustering algorithms can be applied to those anomaly scores to detect that the anomalies in these columns are all happening on the same set of rows.

Attention is now directed to the subject of model testing (e.g., benchmarking). Given all the data challenges described above, and what is already a fairly complex algorithm, how do you ensure that the model you build actually works on real-world data? Furthermore, how do you make iterative improvements? Collecting benchmark data where humans have labeled what's anomalous and what's not might seem reasonable at first glance, but as discussed above, creating a human-labeled dataset where raters judge what's anomalous is extremely expensive (not to mention subjective). You'd need tens of thousands of labeled anomalies to form a robust benchmark. So, a different approach is needed. A key insight here is that realistic data quality issues can be readily inserted programmatically into datasets. After all, issues are most often caused by code in the first place. We've found that detecting synthetic anomalies (also referred to as synthetic issues, synthetic data anomalies, synthetic data issues, or chaos) is a good proxy for detecting real data quality issues.

Thus, the algorithm for benchmarking is roughly as follows: collect a representative sample of tabular datasets, run your model on these datasets both before and after introducing synthetic anomalies, and measure statistics around the runtimes and accuracy of your evaluation. This can allow an operator to fine-tune their model in ways that will hopefully improve the model's results and statistics (e.g., by changing parameters or dampening features). This benchmarking and fine-tuning (e.g., of model hyperparameters) can be performed iteratively to continually or gradually improve model performance.

The following description first addresses examples of kinds of synthetic anomalies that can be introduced and how, then moves on to address benchmarking and fine-tuning of the model.

"Chaos engineering" is the idea of purposefully creating random failures in a system to test how the system responds. One example is a tool that randomly terminates production instances to test a network's resiliency. This idea translates well to testing data quality monitoring models. Benchmark datasets can be manipulated (e.g., with SQL) to simulate real data quality problems that can occur in production systems. Since real data issues tend to affect only part of the data, it can be important to also vary how synthetic anomalies (also referred to as synthetic issues) are applied: to a segment, random columns, random percentages of the data, etc. Then a model's performance can be measured according to ML metrics like sensitivity, specificity, and the area under the curve (AUC), and also look at other performance characteristics such as how much time the model needs and how good it is at detecting certain kinds of issues compared to others.

FIG. 7 illustrates sample table of ticket sales data. In table 700 of FIG. 7, each row corresponds to a listing of a number of tickets to a concert or sporting event. For example, it can be seen that "listid" number 43729 (the last row) was a listing for four tickets at $131 per ticket (a total of $524) for The Who at Reliant Stadium in Houston, Texas (which seats 72 k people).

Imagine we know that for the "numtickets" column, the maximum value is 30. One way to test whether an algorithm is capable of detecting a distributional change in the number of tickets would be to introduce some artificial chaos and change the values of the "numtickets" column to include the value 40. In this example, it's important to do this only for the most recent date so that this change will appear as a sudden anomaly in the dataset. Furthermore, to make this data quality issue a bit more subtle, we can ensure that the synthetic anomaly only applies to 30% of the records. For example, a "where_sql" clause can be included that causes the chaos to apply only to tickets sold in "venuestate"='NY'.

In practice, the SQL to inject this chaos into the table looks like:

```
WITH chaosed_table AS (
    SELECT "listid",
        "listtime",
        "sellerid",
        CASE
            WHEN random( ) < 0.3 THEN 40
            ELSE "numtickets"
        END AS "numtickets",
        "priceperticket",
        "totalprice",
        "eventid",
        "eventname",
    "catid",
    "catgroup",
    "catname",
    "venueid",
    "venuename",
    "venuecity",
    "venuestate"
    FROM fact_listing
    WHERE listtime >= Cast(
        Cast('2022-05-04' AS DATE) AS TIMESTAMP without time zone
    )
    AND listtime < Cast(
        Cast('2022-05-05' AS DATE) AS TIMESTAMP without time zone
    )
    AND venuestate = 'NY'
),
all_other AS (
    SELECT *
    FROM fact_listing
    WHERE NOT (
        listtime >= cast(
            cast('2022-05-04' AS date) AS timestamp without time zone
        )
        AND listtime < cast(
            cast('2022-05-05' AS date) AS timestamp without time zone
        )
        AND venuestate = 'NY'
    )
)
SELECT *
```

-continued

```
FROM chaos_table
UNION ALL
SELECT *
FROM all_other
```

While this may sound like a silly example, it is surprising how often prices can change due to a data quality error.

If testing models frequently, it's helpful to encapsulate operations like these into a library of synthetic anomaly injections operations. Examples of synthetic anomaly injection operations in such a library include:

ColumnDropValue[†]
    Drops all rows from table.column with a given value.

ColumnGrow[†]
    Multiplies a column by a random value drawn uniformly from [low, high]. Use grow_sumbol='+' to achieve additive growth.

ColumnIdentity[†]
    Does nothing to a Column (if a tree falls . . . ).

ColumnInfrequentDrop[†]
    Drops rows with values equal to an infrequent randomly chosen value, which must represent between low_threshold and high_threshold fraction of records for a given column. If no such value exists, this check will throw an error.

ColumnModeDrop[†]
    Drops rows with values equal to the mode of a given column. Requires that the mode represents at least threshold fraction of the data or else will throw an error. This is designed to prevent chaos where the mode is very rare.

ColumnModeDropString[†]
    Drops rows with values equal to the mode of a given string column. Throws an exception if the column is not a string column.

ColumnModeNull[†]
    Replaces values equal to the mode in a column with Null. Requires that the mode represents at least threshold fraction of the data or else will throw an error. This is designed to prevent chaos where the mode is very rare.

ColumnModeNullString[†]
    Replaces values equal to the mode in a string column with Null. Throws an exception if the column is not a string column.

ColumnModeOnly[†]
    Replaces values in a column with the mode.

ColumnNull[†]
    Turns table.column into NA for a fraction of records.

ColumnRandom[†]
    Replaces values in a column with random floats or integers within the column range, or 50/50 split of True/False for boolean, or a hash of the string.

ColumnReverseChar[†]
    Reverses the characters in a string column. NULL values are left NULL.

ColumnShrink[†]
    Divides a column by a random value drawn uniformly from [low, high].

ColumnShuffle[†]
    Shuffle the values in a column for a fraction of records.

ColumnValue[†]
    Turns table.column into the given value for a fraction of records.

ColumnZero[†]
    Turns table.column into 0 for a fraction of records.

RowShuffleType
    Shuffles all column values of a specific type for a random subset of records.

TableColumnNameDrop
    Drops columns from a table.

TableDelete[†]
    Drops rows from a table (randomly sampled from original table).

TableIdentity[†]
    Does nothing to a Table (the most subversive form of chaos known).

TableReduceDates
    Reduce the data in a table to only the rows from a list of dates.

TableReplicate[†]
    Adds additional rows to a table (randomly sampled from original table).

TableSampleByDay
    Randomly samples N records by day from a given table.

TableSelect
    Selects a specified subset of columns from a table.

TableSelectSQLAdd
    Adds an additional SQL statement.

Time TableHourDrop
    Drop a fraction of records for a specific hour, if no records exist on that hour then throw an error.

[†] also includes Time* variant

The above extensive collection of types of issues can be introduced into the data in order to confirm that data quality checks indeed catch them. In some embodiments, a library or synthetic anomaly injection includes one or more issues other than those listed above.

In addition to the types of issues introduced into the data, the manner of introducing the issues can be important. In some embodiments, introducing synthetic issues is done without actually impacting (e.g., writing to) the data in which they are introduced. For example, this can be done using lookup tables and is described in more detail below (e.g., with respect to FIGS. 13A and 13B). Additionally, injecting synthetic issues ideally should not require any adjustment to how the altered data is queried. For example, a query that works on table X should work after synthetic anomalies are applied to table X. This can involve, for example, not changing the structure of a table. In some embodiments, the synthetic data injection is SQL based and works on any SQL compatible database engine (e.g., with minimal adjustments). In some embodiments, the introduction of synthetic issues is "pushed down" to the SQL warehouse (database) itself. This can allow issues to be introduced in very large datasets (where other techniques for synthetic issues would fail) because the dataset can remain in the SQL warehouse. In some embodiments, a unique ability to instantly undo and clear out any issues introduced is provided. For example, injected anomalies can easily be cleared (e.g., by deletion of entries in the lookup table) so that subsequent queries to the data are not affected.

In sum, synthetic anomalies can be injected using a random anomaly generator that samples synthetic anomaly injection operations (e.g., from a library), then samples columns to apply the chaos to, then samples a fraction of records to apply the chaos to. In some embodiments, if the end result is not a viable synthetic anomaly operation (e.g., does not actually change the data), the random anomaly generator keeps retrying (iterating). This can allow simulation of data quality issues using a library of operations, and identification of how well a model does at identifying and explaining the synthetic anomalies when they occur.

One potential advantage of intelligently injecting synthetic issues as described here is avoiding overfitting a model to test data. For example, without injecting artificial issues where the ground truth is known, any model built on top of a set of training data will generally overfit the training data presented and not generalize well in practice.

In some embodiments, a synthetic anomaly injection operation library includes methods that can operate on rows of data (e.g., duplicating or deleting them) and on columns of data. The column operations can include things like replacing values with NULL values, shuffling values, or altering the values (via numeric or string operations).

Attention is now directed to the concept of benchmarking. Benchmarks are composed of many sample datasets; these are referred to as backtests. Each backtest represents a historical sample from a dataset over a consecutive period of days. For each backtest, the model can be run on each day in sequential order. This simulates the dataset being configured and new records arriving each day. At this stage, important data points to capture can include an overall anomaly score for each table (e.g., the same type of score used in FIG. 4) and the learned dynamic threshold for alerting. This will give a baseline of how anomalous the model believes the benchmark data is before any synthetic anomalies are introduced.

Once the initial run is complete, the benchmarking process can then cycle back through the data—only this time, for example, each day synthetic anomaly operations will be injected (e.g., randomly) into the data. Then, the model is rerun to see if it is able to detect the injected anomalies. Again, keeping track of the anomaly score will indicate how sensitive the model is to each particular synthetic anomaly injection operation.

Figure 8:
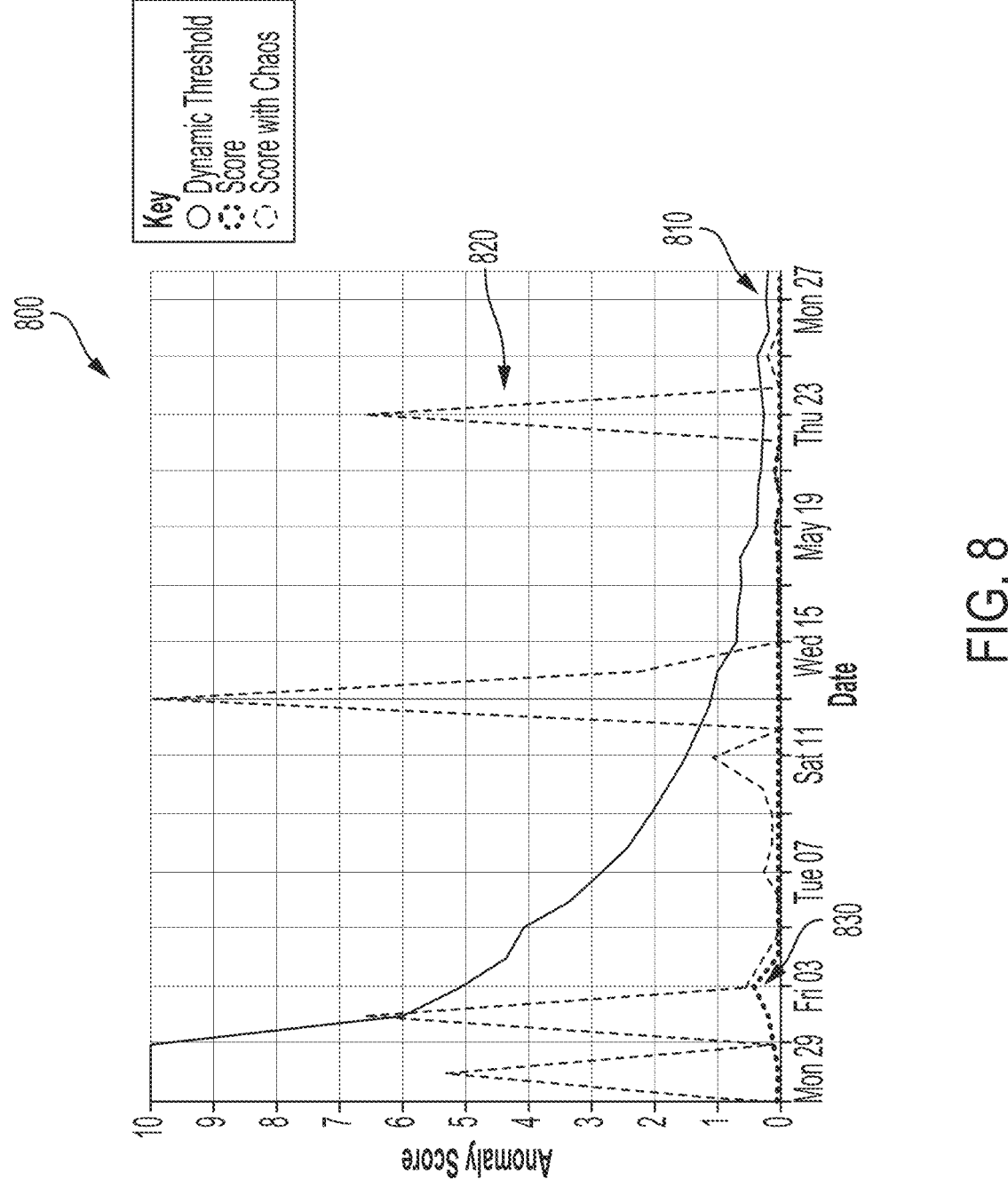
FIG. 8 illustrates a backtest result showing an example anomaly score for the table with and without synthetic anomaly injection operations applied.

FIG. 8 illustrates an example backtest showing the anomaly score for a table with and without injected chaos. For example, diagram 800 of FIG. 8 is a plot that summarizes the results for the backtest on a single table containing data from April 29 to May 28. Beginning on April 29, the model is built for that date, the results are logged, and then the model is stepped through each date in turn until finishing on May 28. This process is then repeated while injecting synthetic data quality issues into the dataset. The model learns a threshold for alerting as it experiences more and more anomalies over time.

Line 830 shows the anomaly score from the model before any synthetic anomalies are introduced. It can be seen that it rises on May 3 but otherwise remains close to zero. It's common for a table to have higher anomaly scores in the early days, as the model is still learning what columns and features represent intermittent changes that need to be dampened to find true anomalies. The fact that the score stays near zero indicates that, once these are controlled for, the dataset is very predictable and regular.

Line 810 shows the threshold (dynamic threshold) for the anomaly score. This begins at 10, the highest possible anomaly score (representing an extreme change that affects 100% of the data). As discussed above, in this example this score threshold is held at this highest value for three days, and then it begins to exponentially decay. At the end of the 30 days, the threshold has fallen all the way to below 0.3, which would be sensitive enough to detect a moderate anomaly.

Finally, line 820 shows what happens to the anomaly score when synthetic anomalies are added to the dataset. On the second day, the score jumps over 5—an extreme anomaly likely caused by a significant chaos operation. But the threshold is still so high (10) that this issue would be suppressed. This is the result of being conservative about alerting, especially in the early days. By the fourth day, however, the score jumps above 6.5, and this is just high enough to pass the threshold. Even in the first week, a sufficiently anomalous change in the data can cause the model to alert. Going past day 30, and ultimately day 90, the model becomes well calibrated to the level of expected noise in the data and is much more sensitive to chaos.

In sum, benchmarking can involve running the model in a "sequential" manner. In some embodiments, this involves first building the model for N days for each of M data sources. For each day/source combination {n, m}, the model uses data for days k<=n in order to decide how to handle seasonality, how to set a dynamic threshold, and what encoders to exclude or dampen. For example, this gives baseline results for "no chaos introduced", and simulates closely (aside from not having updated in place changes) how the model runs in production. In some embodiments, the process includes running all NxM days again, but with introduced synthetic anomaly operations introduced (e.g., randomly).

One potential advantage of benchmarking is that it provides clear insights into how any given change in a code base affects the performance of a model, so that software and model development can move faster. Another potential advantage is that humans do not need to label anomalies by hand, which is hard to do as this is not a task that humans are good at (sifting through huge volumes of structured data to find an anomaly). Another potential advantage is that if a change in the model is inadvertently shipped that affects the model's performance, it can be discovered by regular (e.g., daily) benchmarks that will alert on any meaningful changes in performance.

Figure 9:
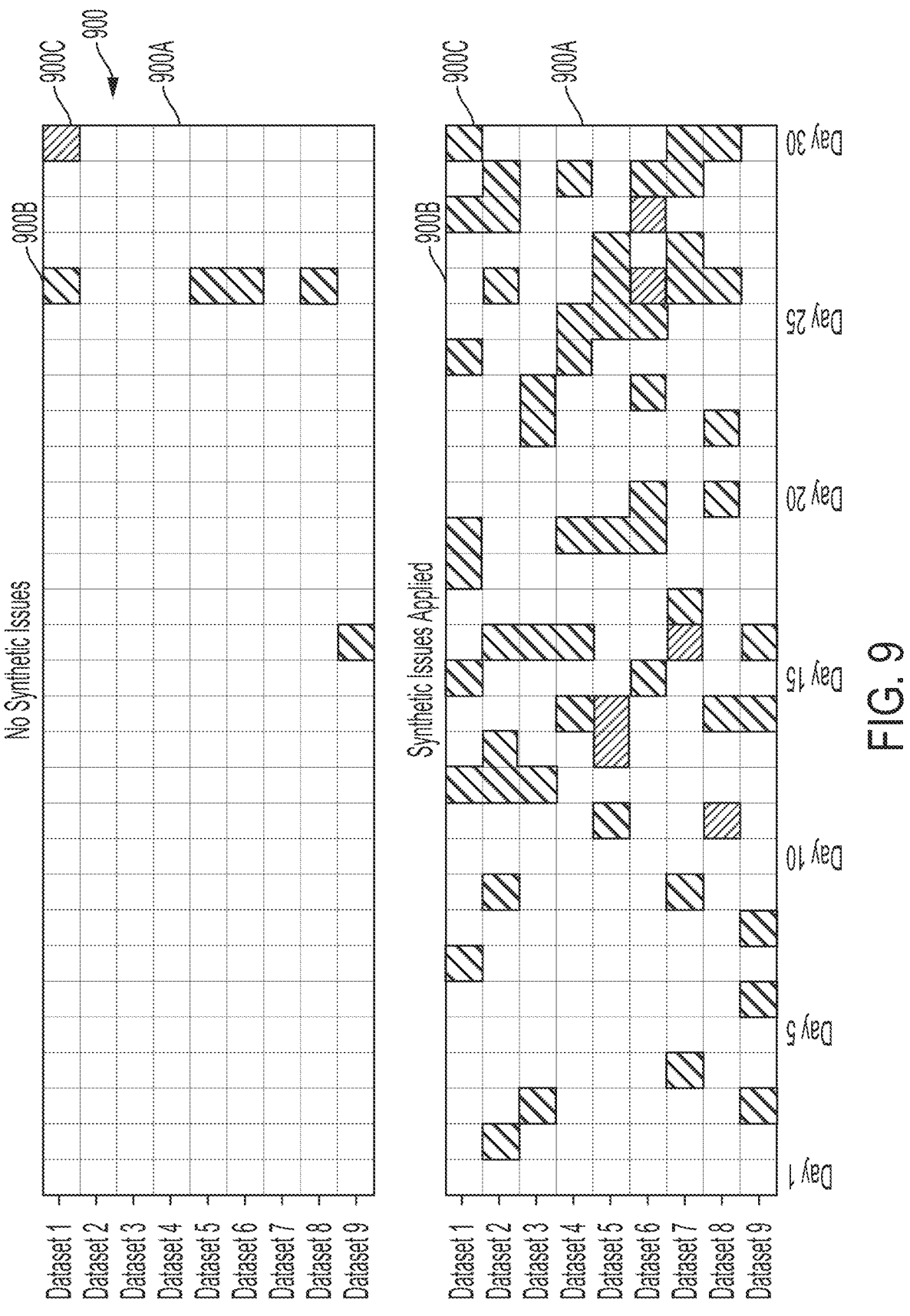
FIG. 9 illustrates backtest results for sample datasets.

FIG. 9 illustrates backtests for nine sample datasets over 30 days. In diagram 900 of FIG. 9, the y-axis shows nine backtests for nine sample datasets, each evaluated over 30 days (the x-axis). The top panel of diagram 900 represents the results of applying the model to data with no synthetic issues injected. The bottom panel of diagram 900 represents the results of applying the model to data with synthetic issues injected. In this example, a square with a first pattern (e.g., square 900B, in the top panel with no synthetic issues applied, illustrates an example first pattern) indicates that the model sends an alert, while a square with a second pattern (e.g., square 900C, in the top panel with no synthetic issues applied, illustrates an example second pattern) indicates that the model was close to alerting. A square with a third pattern (e.g., square 900A, in the top panel with no synthetic issues applied, illustrates an example third pattern, which is a blank pattern) indicates a day when the model does not alert (and was not close to alerting). As you can see, alerts are infrequent in the early days.

Comparing the top and bottom panels of diagram 900, it is clear that the applied model is quite sensitive to the introduction of chaos, and that this is true for each of the different datasets. However, in the bottom panel, there are many days that still have the third pattern (no alert)—even though synthetic anomalies are applied every day. This can happen for a few different reasons. The first reason is that the threshold is still set very high, as the threshold is gradually decayed from 10 (very hard to alert) down towards the learned threshold for the dataset. Even by day 30, this decay is not yet complete. The second reason is that, in some cases, synthetic anomalies were introduced that are very rare. It may be targeted at only 1% of records, making the anomaly much harder to detect. The third reason is that, in some cases, the synthetic anomalies that were introduced may not actually change the data. For instance, if an injected anomaly operation changes 5% of the values in a column to be NULL, this won't make a difference if 99% of the values in the column were already NULL.

Attention is now directed to techniques for analyzing performance of the model. To understand how well the model performs, there are different types of performance metrics that can be computed for the entire benchmark, such as AUC, F1 score, precision, and recall. No matter what metrics are chosen, there are many different ways of dividing up the results: by dataset, by how many days the model has been running, by the type of synthetic injection operation(s) used, and by the percentage of records the synthetic anomalies are applied to (the chaos fraction). In practice, all of these (and more) can be looked at to better understand how the model is performing and how it might be improved.

The chaos fraction is particularly useful, as it can provide a sense of how well the model is performing at the limit (when applying chaos to the entire dataset, the model is expected to perform well), and where the model begins to be unable to detect issues given the sample size of data it is working with.

Figure 10:
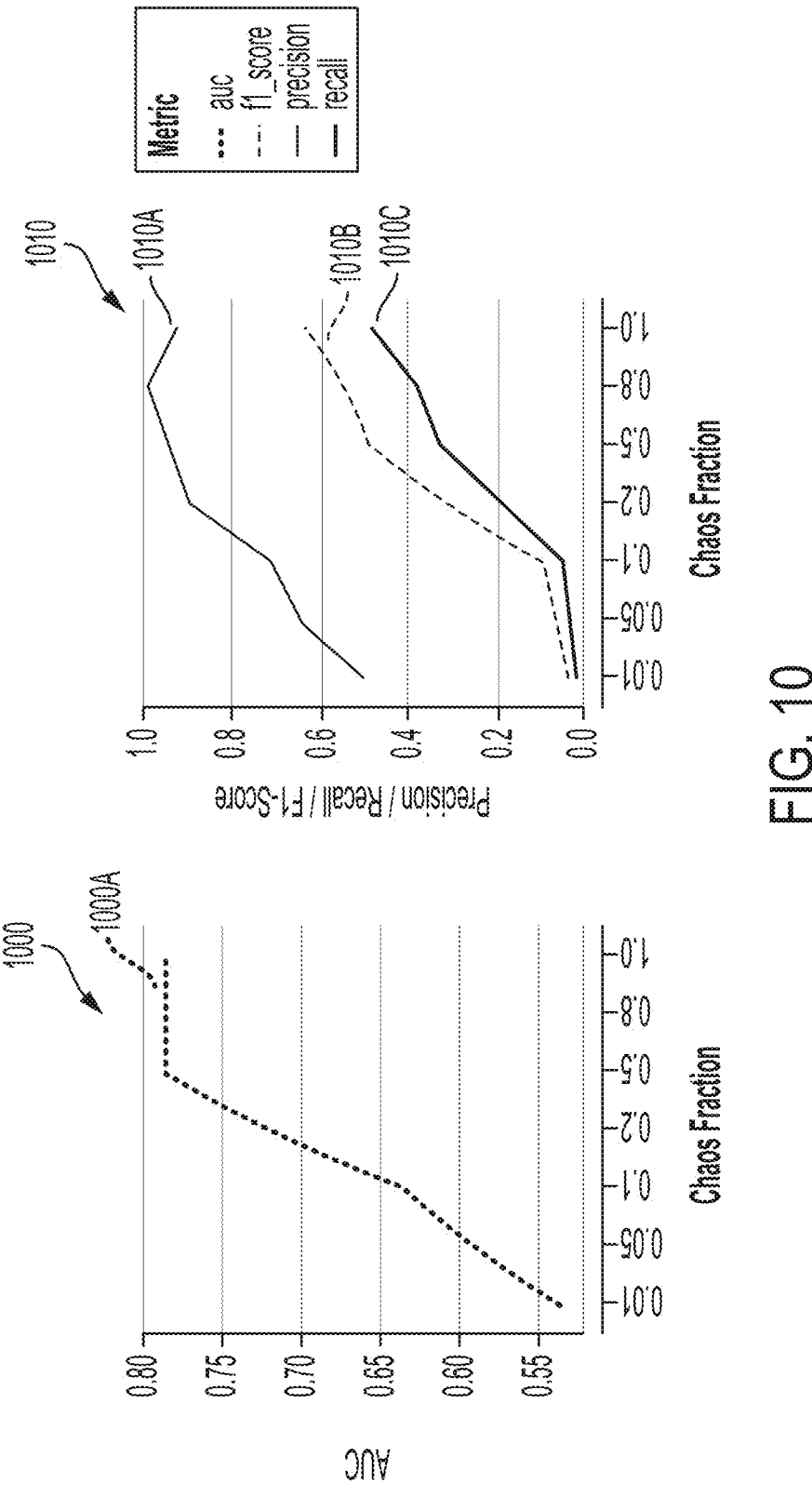
FIG. 10 illustrates example performance metrics for a model benchmark over different chaos fractions.

FIG. 10 illustrates visualizations of performance metrics for a model benchmark over different chaos fractions. In FIG. 10, the x-axis is the fraction of records that have had a given chaos operation applied (the chaos fraction) (ranging from 1% to 95% of records in this example), and the y-axis represents a performance metric.

The first panel 1000 of FIG. 10 plots the AUC (area under curve) metric as line 1000A. This compares the anomaly score that is produced for a given date (the "prediction") to the binary "outcome" of whether a synthetic anomaly was introduced on that date (e.g., using the knowledge of where in the data synthetic data anomalies were introduced). The AUC measures the area under a curve traced out by varying a decision threshold for the score from 0.0 up to 10.0 and measuring the false positive and true positive rates for classifying each {table, date} combination as either having chaos (an anomaly) or not. When the AUC is near 0.50, the model is performing no better than a random guess. When the AUC is near 1.0, the model is perfectly able to detect chaos in the data.

First panel 1000 of FIG. 10 illustrates that the AUC steadily rises from near 0.50 at 1% chaos, to close to 0.80 at 50% chaos and above. In practice, these AUC statistics can underrepresent how well the model performs for one or more possible reasons. The first such reason is that some of the {table, date} combinations that do not have chaos will actually have real anomalies in the source data that the model would want to alert on. In other words, not all of the "negative" examples here are true negatives. The second reason is that some of the synthetic anomaly operations are affecting a much smaller percentage of records than the chaos fraction would suggest. The fraction places a maximum on the percentage of records affected-if the injection operation is altering the mode of a column, or an infrequent value, or making a change that already exists in the data, the chaos may be impossible to detect. The third reason is that a benchmark (as in this example) is measuring performance over the first 30 days of the model run, but in practice the performance of the model should continue to increase dramatically up to 90 days.

While the AUC is helpful to understand how good our model is at distinguishing if chaos was applied, it does not explain if the model is doing a good job of setting a threshold. The second panel 1010 of FIG. 10 directly measures precision (line 1010A), recall (line 1010C), and F1 score (line 1010B) based on the decision to alert if the score is above or below the learned threshold.

In this context, precision measures what fraction of the time the model alerts when there is a known data modification (due to a synthetic data anomaly operation) present. This can help understand how often the model might have false positive alerts. As can be seen by line 1010A in FIG. 10, when the synthetic anomalies affect a very small percentage of records (low chaos fraction), precision is about 50%. But when the synthetic anomalies affect a large percentage of records, precision is up to 90%.

Recall measures the percentage of known data modifications (due to a synthetic data anomaly operations) the model is able to alert on. Referring again to FIG. 10, it can be seen by line 1010C that recall begins quite low (near 0) but rises to almost 50% when chaos is applied to more than half of the data. Again, recall may be low because synthetic anomalies are difficult to detect, due to the reasons stated above. One way to improve recall is to make adjustments to the algorithm for thresholding (e.g., start lower, decay faster, or converge to a lower quantile estimate for the score), thus making the model more sensitive to injected anomalies. However, this increases the likelihood of false positives (and alert fatigue), especially in the early days when the model is still being calibrated.

The F1 score takes into account both the precision and the recall and is computed as $2*((precision*recall)/(precision+recall))$. This is illustrated in FIG. 10 as line 1010B. There are many changes that might improve precision but not recall, or vice versa, and the F1 score can provide an indication of whether a change is good or bad based on the combined effect. Note that in practice, the cost of false positives and false negatives can be estimated directly and used to make decisions about how to improve and calibrate the model.

The following Python pseudocode gives an example of how to apply the approach outlined here to benchmark an algorithm. The example below assumes an implementation that has the "detect_anomalies" method, and a collection of tables and their configuration information. It then runs a backtest for each table with and without synthetic anomalies injected and summarizes the anomaly scores for each. Then it computes the AUC of the algorithm based on how accurate it is at "predicting" which results had chaos introduced. This code is not meant as a complete and literal implementation, and is just meant to illustrate the concepts and how they fit together at a high level. In particular, the algorithm may maintain state from one run to the next (e.g., the threshold calculation).

Start by defining how to calculate anomaly scores for a given date range and table:

```
#General imports
import datetime as dt
from sklearn.metrics import roc_auc_score
#Import hypothetical sub-modules that perform more detailed tasks
from chaos import generate_random_chaos
from prior chapter import detect_anomalies
def calculate_anomaly_scores(
    table: str,
    time_column: str,
    current_date: dt.date,
    prior_date: dt.date,
    sample_size: int = 10_000
) -> float:
    column_scores = detect_anomalies(
        table, time_column, current_date, prior_date, sample_size
    )
    return sum(column_scores.values())
```

Then backtest the anomaly detection logic over a range of dates to get the anomaly scores with and without synthetic anomalies (chaos):

```
def backtest(
    table: str,
    time_column: str,
    start_date: dt.date,
    number_of_days: int
) -> list[list[float]]:
    anomaly_scores = [ ]
    chaos_anomaly_scores = [ ]
    for day in range(number_of_days):
        current_date = start_date + dt.timedelta(days=day)
        prior_date = current_date - dt.timedelta(days=1)
        overall_score = calculate_anomaly_scores(
            table, time_column, current_date, prior_date
        )
        anomaly_scores.append(overall_score)
        #Introduce chaos and recalculate
        table_chaos = generate_random_chaos(table, time_column, current_date)
        chaos_overall_score = calculate_anomaly_scores(
            table_chaos, time_column, current_date, prior_date
        )
    chaos_anomaly_scores.append(chaos_overall_score)
return anomaly_scores, chaos_anomaly_scores
```

Next, run backtests on multiple table configurations to benchmark their performance:

```
def benchmark(
    table_configurations: list[dict],
    number_of_days: int
) -> list[dict]:
    -
    Runs backtests on multiple table configurations to benchmark their performance.
    -
    benchmark_results = [ ]
    for config in table_configurations:
        anomaly_scores, chaos_anomaly_scores = backtest(
            config['table'],
            config['time_column'],
            config['start_date'],
            number_of_days
        )
        benchmark_results.append({
            'table': config['table'],
            'anomaly_scores': anomaly_scores,
            'chaos_anomaly_scores': chaos_anomaly_scores
        })
    return benchmark_results
```

Finally, calculate a single AUC metric (as an example model or performance metric) based on the anomaly and chaos scores from all the tables:

```
def calculate_global_auc(benchmark_results: list[dict]) -> float:

Calculate a single AUC based on the anomaly and chaos scores from all tables.

all_anomaly_scores = [ ]
    all_chaos_anomaly_scores = [ ]
    for result in benchmark_results:
        all_anomaly_scores.extend(result['anomaly_scores'])
        all_chaos_anomaly_scores.extend(result['chaos_anomaly_scores'])
    # Create labels: 0 for anomaly, 1 for chaos
    y_true = [0] * len(all_anomaly_scores) + [1] * len(all_chaos_anomaly_scores)
    # Concatenate scores
    y_scores = all_anomaly_scores + all_chaos_anomaly_scores
    # Calculate AUC
    auc = roc_auc_score(y_true, y_scores)
    return auc
```

Benchmarking and analyzing performance metrics can be extraordinarily helpful to understand and debug a model. It is also a way to prove to users that a system is working as expected. But one of the most important ways this data can be used is to validate changes to the model, to ensure it is being fine-tuned in a way that will add value.

FIG. 11 illustrates an example of performance metrics computed for a benchmark, with the goal of measuring if a change to the model is improving the model in the right direction. The hypothetical update being evaluated in FIG. 11 was a new type of feature that allowed the model to be even more sensitive to changes in patterns in string columns (e.g., phone numbers, identifiers, etc.). The change increased (by 16%) the benchmark's runtime meaningfully, which suggests it may be important to optimize the change further to avoid increasing the overall latency and costs of the model. However, on the positive side, the change significantly improved both precision (by 1%) and recall (by 11%) by reducing the number of false negatives. The AUC also improved (by 1%), although the percentage improvement appears small on an absolute basis. But if instead a measure is taken that indicates how much greater than 0.5 did the AUC rise (since that indicates random behavior), the AUC improvement is actually $(0.624–0.5)/(0.617–0.5)–1=5\%$ better, which is significant. This is indicated in FIG. 11 as "AUC-0.5". In FIG. 11, values in the "% Change" column having a hatched pattern (e.g., precision, recall, F1-score, and AUC-0.5) indicate improvements (positive performance changes) and values in the "% Change" column having a cross-hatched pattern (e.g., hours) indicate potential negative performance changes. Values without a pattern indicate insignificant changes.

The outcome of testing models (e.g., benchmarking models by injecting anomalies into sample datasets) can help measure the model's performance and iterate on it over time.

Figure 12:
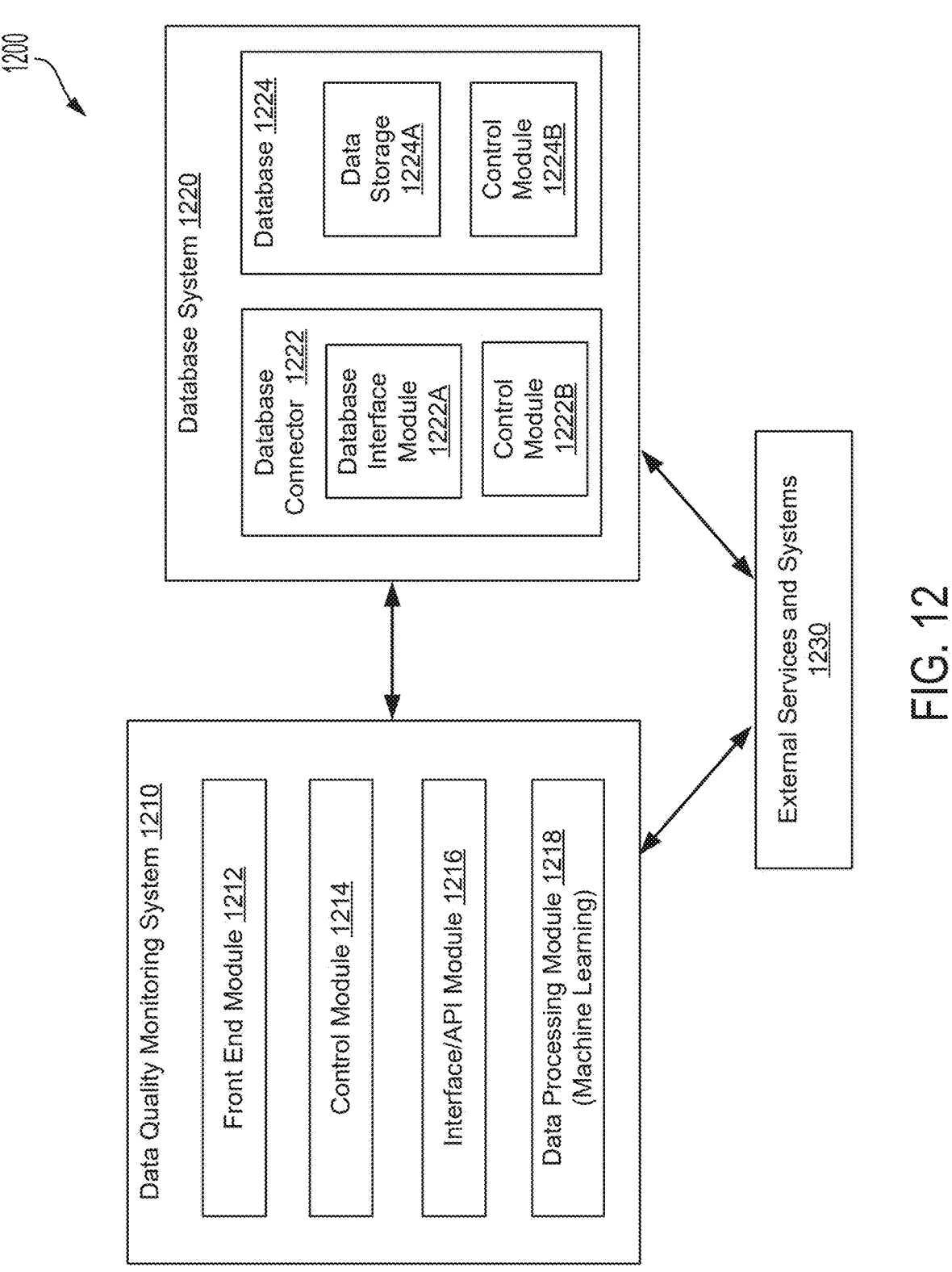
FIG. 12 illustrates a block diagram of an example architecture of components used to perform data quality monitoring and testing.

FIG. 12 illustrates a block diagram of an example architecture of components used to perform data quality monitoring and testing. Diagram 1200 of FIG. 12 depicts these components as functional blocks. In some embodiments, these functional blocks can be implemented in software, hardware, or both. In some embodiments, these functional blocks can be implemented by one or more computer systems (e.g., 1700), either local or remote from each other. For example, the functional blocks of data quality monitoring system 1210 can be implemented by multiple computer systems (e.g., 1700) (e.g., servers) in communication via remote connections. In some embodiments, the components illustrated in diagram 1200 can include fewer functional blocks, additional functional blocks, or different functional blocks than illustrated in FIG. 12. Further, the functional blocks illustrated in FIG. 12 can represent one or more software applications, processes, or modules that perform the same or different operations. For example, interface/API module 1216 can include multiple different APIs for interfacing with different resources. The components or functional blocks illustrated in FIG. 12 can be used to perform some or all of the functionality as described with respect to FIG. 1. For example, data quality monitoring system 1210 can perform the functions as described with respect to data quality monitoring system 110. For example, database system 1220 can perform the functions of data storage 104.

The components illustrated in FIG. 12 can be used to perform implement a data quality monitoring platform as described here. For example, these components can be used to build, train, deploy, backtest, benchmark, and adjust (fine tune parameters of) a model (e.g., unsupervised ML model) used for data quality monitoring. Additionally, these components can be used to process data (e.g., feature encoding, creating snapshots, or other performing other functions) and output performance metrics, alerts, visualizations, or other actionable data for the data quality platform.

Diagram 1200 of FIG. 12 includes a data quality monitoring system 1210 that is in communication with a database system 1220. In this example, data quality monitoring system 1210 is remote from database system 1220. Data quality monitoring system 1210 and database system 1220 are both in communication with external services and systems 1230. In some embodiments, data quality monitoring system 1210 and database system 1220 are in communication with the same or different external services and systems (e.g., represented collectively as external services and systems 1230).

Data quality monitoring system 1210 of FIG. 12 includes the following functional blocks: front end module 1212, control module 1214, interface/API module 1216, and data processing module 1218. Front end module 1212 represents functionality and resources that provide a user the ability to access and interact with data quality monitoring system 1210. For example, the front end module 1212 can provide graphical user interfaces, accessible through a web browser, for interacting with a data quality monitoring platform implanted by data quality monitoring system 1210. In some embodiments, access to data quality monitoring system 1210 is provided via an API (e.g., handled by or in conjunction with interface/API module 1216).

Control module 1214 represents functionality related to controlling or orchestrating data quality monitoring. For example, control module 1214 can create jobs that are queued and scheduled for execution (e.g., processing resources of data quality monitoring system 1210). In some embodiments, the control module 1214 coordinates a dynamic pool of workers (computing resources) that can pick up these jobs and process them. Examples of jobs can include metadata retrieval tasks, SQL queries, data quality check logic, or data processing jobs (e.g., using an ML model). For example, when workers perform data quality checks, they can send notifications to external channels (e.g., Slack, Microsoft Teams, PagerDuty) and can read from the data sources (e.g., warehouses, data lakes, or databases) that are being monitored (e.g., Snowflake, Databricks, BigQuery, Amazon Redshift). Typically, the data sources are external to data quality monitoring system 1210 and part of database system 1220 or external services and systems 1230. The workers controlled by control module 1214 can write objects they process, such as samples of record-level data or visualizations they produce, into a cloud object store (e.g., such as AWS S3) (e.g., of external services and systems 1230). In some examples, the cloud object store is a file storage bucket controlled by the user of data quality monitoring system 1210.

Interface/API module 1216 represents functionality related to communication between components or functional blocks. Interface/API module 1216 can enable communication between services, applications, or systems used in performing data quality monitoring. For example, module 1216 can include interfaces and APIs for communicating with database system 1220 and external services and systems 1230. Such communication can include instructions for retrieving data, storing data, modifying data, pushing alerts, configuring or performing jobs, and others. For example, interface/API module 1216 can encompass one or more web APIs used for communication between software systems over a web protocol such as HTTP. Interface/API module 1216 can also include resources for accepting instructions and control via an API client (e.g., running on a user device).

Data processing module 1218 represents functionality related to performing data processing tasks for data quality monitoring system 1210. For example, data processing module 1218 can perform (or cause performance of) data processing associated with jobs issued by the control module 1214. Data processing module 1218 can represent local data processing or remote data processing. For example, data processing module 1218 can represent data processing performed by resources of a single computing system or resource or by multiple computing systems or resources (of the same or different service or provider). For instance, data processing module 1218 can use the same computing resources as control module 1214. As another example, data processing module 1218 can encompass data processing performed by one or more computing resources remote from data quality monitoring system 1210 (e.g., accessed via requests to a cloud-hosted ML model of a service provider different from that of data quality monitoring system 1210).

Database system 1220 of FIG. 12 includes the following functional blocks: database connector 1222 and database 1224. In some embodiments, database connector 1222 represents functionality or resources that enable software applications to communicate with database 1224. For example, database connector 1222 can be software that allows applications (e.g., of data quality monitoring system 1210) to communicate with and access database 1224 to perform operations such as querying, updating, adding, and deleting database records. Database connector 1222 can include functional blocks for performing its functionality, represented in FIG. 12 as database interface module 1222A and control module 1222B. In some embodiments, database interface module 1222A represents functionality related to interfacing with the database 1224 such as connection management, database protocol support, implementation of APIs, or others. In some embodiments, control module 1222B represents functionality related to controlling operation of database connector 1222 including general processing, error handling, software updates, or others. For example, database connector 1222 can implement the connectors 'Psycopg' or 'Psycopg2' to enable a Python application to interact with a PostgreSQL database.

In some embodiments, database 1224 represents functionality or resources that implement a database for data storage. For example, database 1224 can be a PostgreSQL database. Database 1224 can include functional blocks for performing its functionality, represented in FIG. 12 as data storage 1224A and control module 1224B. In some embodiments, data storage 1224A represents resources and functionality related to storing data. For example, data storage 1224A can include hardware resources that store the data and associated software for managing those hardware resources. In some embodiments, control module 1224B represents functionality related to controlling and managing operation of database 1224. For example, control module 1224B can include software for performing functionality such as a database management system (DBMS), schemas, query handling, indexes, authentication and authorization, data backup and recovery, or others.

In some embodiments, external services and systems 1230 represents functionality and resources that can be used by one or more of data quality monitoring system 1210 or database system 1220 for supporting data quality monitoring. External services and systems 1230 in FIG. 12 is used to represent any number of various applications, services, or computing resources, each of which can be controlled by the same or different providers. In some embodiments, an external service or system (of external services and systems 1230) communicates with data quality monitoring system 1210, database system 1220, or both. Examples of such external service or system can include messaging services (e.g., for delivering alerts), identity providers, error reporting services, object stores, containers registries, or others.

Figure 13A:
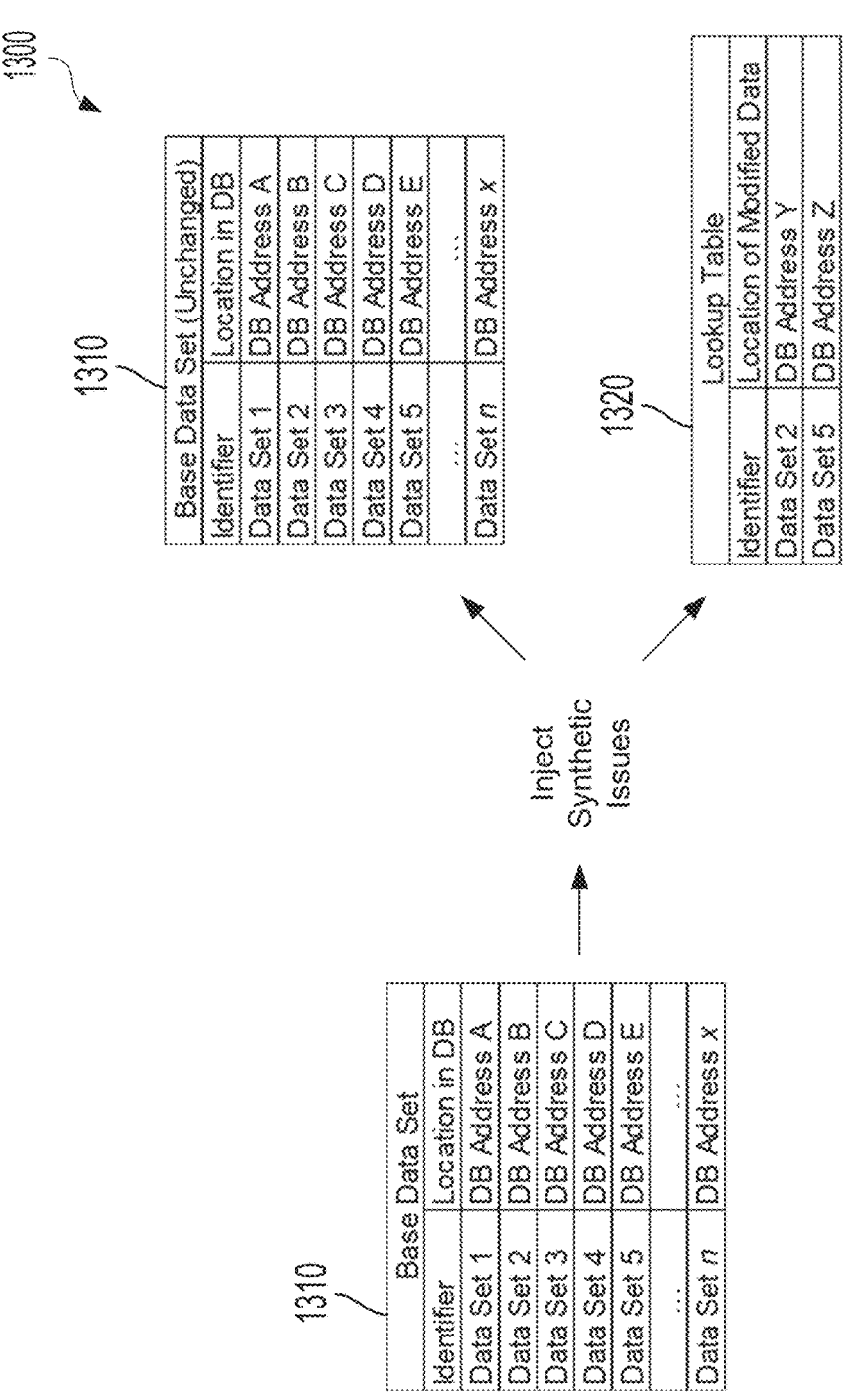
FIGS. 13A and 13B illustrate diagrams of example synthetic anomaly injection operations.
Figure 13B:
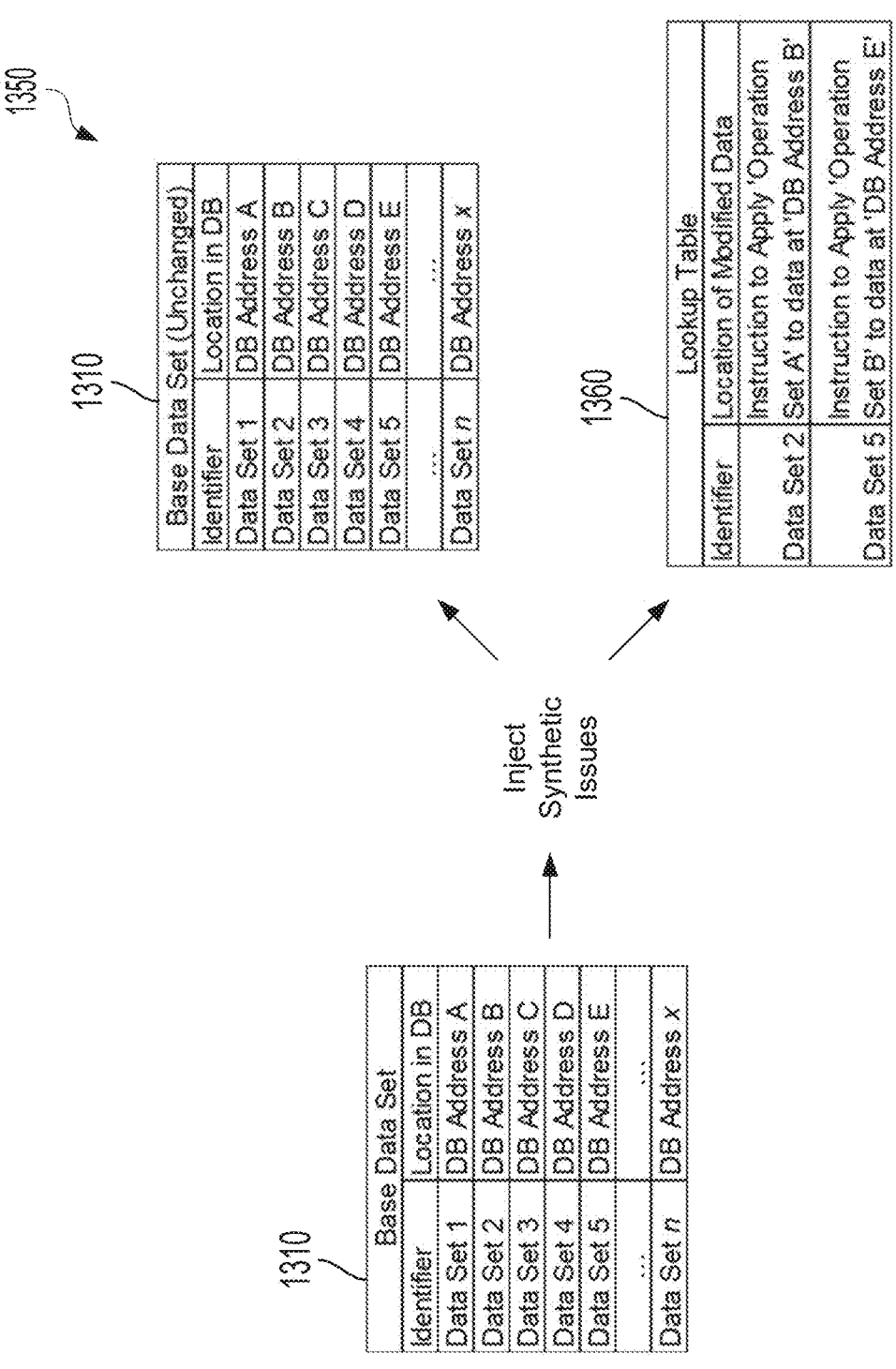

FIG. 13A illustrates a diagram of an example synthetic anomaly injection operation. Diagram 1300 of FIG. 13A illustrates base data set 1310. Base data set 1310 includes a plurality of sets of structured data (e.g., tables). Base data set 1310 is represented as a table that lists an identifier and a corresponding database location of each set of structured data. For example, the sets of data are identified as Data Set 1, Data Set 2, Data Set 3, Data Set 4, and Data Set 5, which can continue up to a Data Set n. In this example, Data Set 1 is located (e.g., stored) at Database (DB) Address A, Data Set 2 is located at DB Address B, Data Set 3 is located at DB Address C, Data Set 4 is located at DB Address D, and Data Set 5 is located at DB Address E, which can continue up to a Data Set n that is located at DB Address x. The representation of base data set 1310 as a table listed relationships between identifiers and locations used in FIGS. 13A and 13B is merely illustrative and not intended to limit the structure or content of a collection of data that can be used with synthetic anomaly injection.

As illustrated in FIG. 13A, base data set 1310 is subjected to one or operations for injecting synthetic anomalies. For example, the synthetic anomalies can represent a set of known data modifications that are used to test an ML model used in data quality monitoring. Such testing can be used to benchmark the ML model enabling the performance of the ML model to be quantified and parameters of ML model to be adjusted to tune performance. Example results of subjecting base data set 1310 to operations for injecting synthetic anomalies are shown on the right side of FIG. 13A. In this example, fewer than all of the sets of data within base data set 1310 are subjected to synthetic anomaly injection operations. In particular, Data Set 2 and Data Set 5 are the sets of data subjected to synthetic anomaly injection operations.

The right side of diagram 1300 of FIG. 13A illustrates base data set 1310, which remains unchanged by the operations for injecting synthetic anomalies. Notably, the location of (e.g., a pointer to) Data Set 2 and Data Set 5 remain unchanged and the data at those locations is also unchanged. Introducing synthetic anomalies without actually impacting (writing to) the base data can have advantages including being able to use production data without risk of modifying it.

The right side of diagram 1300 of FIG. 13A also illustrates lookup table 1320. Lookup table 1320 includes entries corresponding to data sets (or subsets thereof) that are subject to synthetic anomaly injection operations. For example, subjecting the data sets to synthetic anomaly injection operations can include creating entries in a lookup table (and optionally creating the lookup table itself). In the example in FIG. 13A, lookup table 1320 includes an entry for Data Set 2 and an entry for Data Set 5. Each of these entries includes a location of modified data; for Data Set 2 the location is DB Address Y, and for Data Set 5 the location is DB Address Z. In this example, synthetic anomaly injection operations have been performed on the original base data (e.g., located in DB Address B and DB Address E), and the resulting modified data has been stored in respective corresponding locations DB Address Y and DB Address Z.

In some embodiments, lookup table 1320 is stored by a database system. For example, database connector 1222 of database system 1220 of FIG. 12 can store and manage lookup table 1320. In some embodiments, a database connector (e.g., 1222 of FIG. 12) can act as a query interception layer between application code of a data quality monitoring system (e.g., 1210 of FIG. 12) and a database (e.g., 1224 of FIG. 12). For example, database connector 1222 intercepts queries to database 1224 and reroutes (e.g., rewrites) them as specified in the lookup table. In some embodiments, a lookup table (or individual entries within the table) can be active or inactive. For example, if lookup table 1320 is designated as active, queries directed to Data Set 2 at DB Address B can be rewritten or rerouted to DB Address Y as specified in the table. In such example, if lookup table 1320 is designated as inactive (or otherwise is not active or is deleted), queries directed to Data Set 2 at DB Address B will be routed to DB Address B (e.g., will not be rerouted or rewritten to instead access the modified data). In such examples, a database connector managing access to a database (that includes the base and modified data) can manage the rerouting (e.g., rewriting) of the queries according to the active lookup table.

Using a lookup table to represent modified portions of base data can have advantages including providing the ability to create modified data (based on the base data) without creating an entire copy of the base data set. In some embodiments, the modified data is stored in memory in a database connector (e.g., 1222 of FIG. 12). In some embodiments, the modified data is stored in memory in a database (e.g., 1224 of FIG. 12).

FIG. 13B illustrates a diagram of an example synthetic anomaly injection operation. Diagram 1350 of FIG. 13B illustrates base data set 1310, which is the same as described above with respect to FIG. 13A. Similar to as described with respect to FIG. 13A, base data set 1310 is subjected to synthetic anomaly injection operations and, as illustrated on the right side of diagram 1350 of FIG. 13B, base data set 1310 remains unmodified by such operations.

The right side of diagram 1350 of FIG. 13B also illustrates lookup table 1360. Lookup table 1360 includes entries corresponding to data sets (or subsets thereof) that are subject to synthetic anomaly injection operations, similar to as described above with respect to lookup table 1320 of FIG. 13A. Lookup table 1360 differs from lookup table 1320, however. Lookup table 1320 includes addresses where the modified data is stored (e.g., the synthetic anomaly injections have been performed on the base data and the results stored at the location listed in the lookup table). In the example in FIG. 13B, lookup table 1360 includes instructions indicating how to create modified data according to the synthetic anomaly injection operations. For example, lookup table 1360 includes an entry for Data Set 2 and an entry for Data Set 5. Each of these entries includes instructions specifying injection operations that should be performed (e.g., have not yet been performed) on a specified portion of the base data; the Data Set 2 entry includes instructions to perform one or more injection operations (e.g., referred to as "Operation Set A") on the base data located at DB Address B, and the Data Set 5 entry includes instructions to perform one or more injection operations (e.g., referred to as "Operation Set B") on the base data located at DB Address E. In this example, the modified base data that results from carrying out the instructions included in lookup table 1360 can be stored at respective locations (e.g., in memory in a database connector or a database) (e.g., such as DB Address Y and DB Address Z), and queries directed to Data Set 2 or Data Set 5 while the entries are active can be rerouted to the corresponding respective location.

In some embodiments, entries in the lookup table includes one or more additional values. For example, lookup table 1360 can add a location address of the modified data after performing the instructions to a corresponding data entry. In some embodiments, lookup table 1360 includes one or more locations of instructions or the set of synthetic anomaly injection operations (e.g., the lookup table does not necessarily include the instructions or the particular set of operations). Using a lookup table that indicates instructions to be performed on the base data can allow efficient utilization of database resources, for example, by allowing modified data to be determined (e.g., and stored) in response to querying.

Figure 14A:
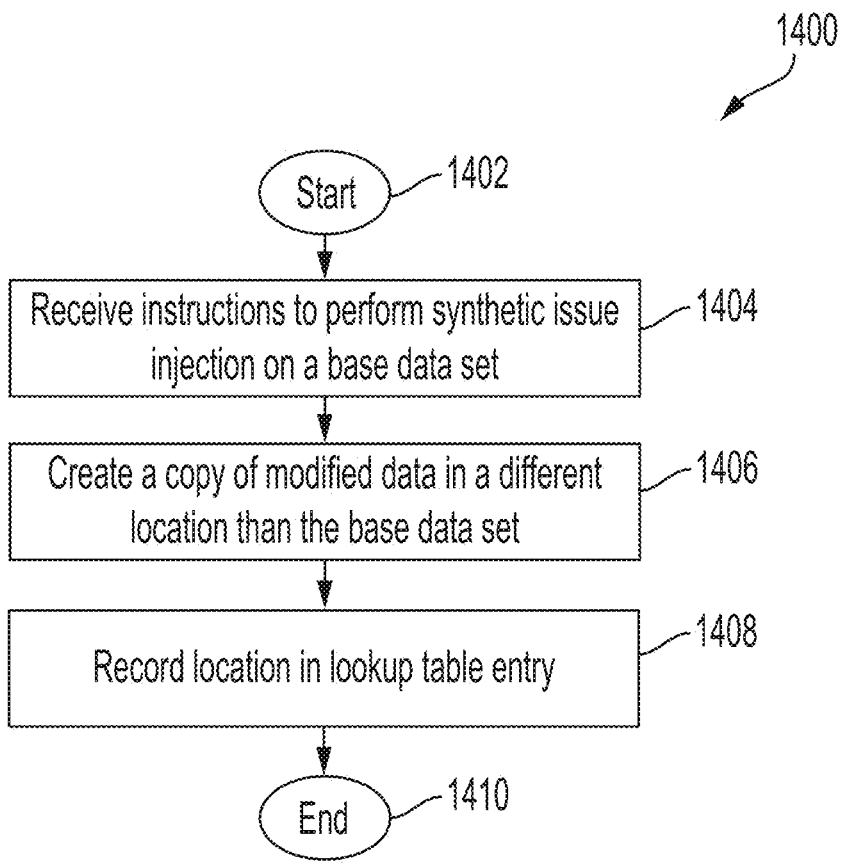
FIGS. 14A and 14B illustrate example processes performed by a database system.
Figure 14B:
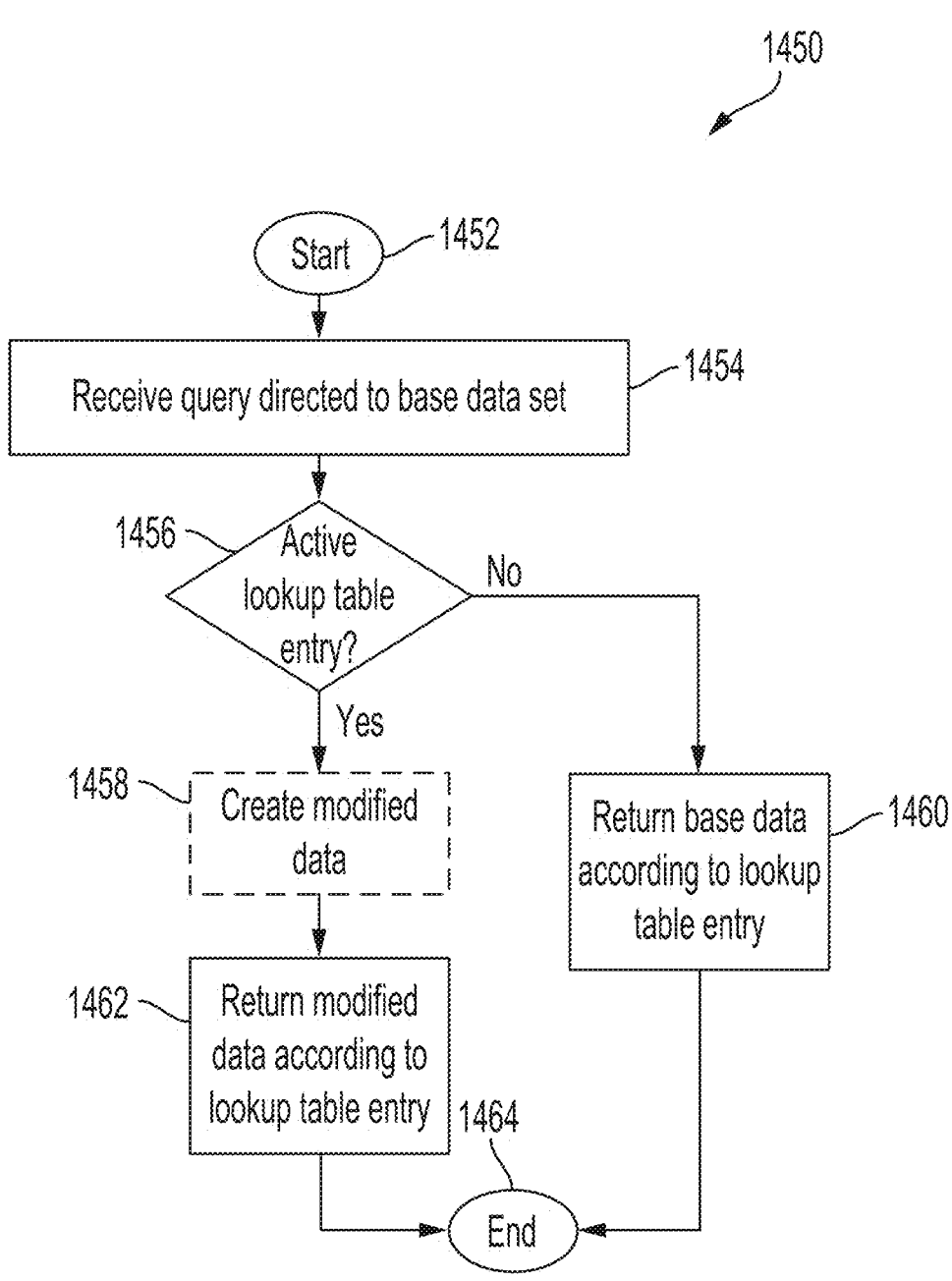

FIGS. 14A and 14B illustrate example processes performed by a database system (e.g., 1220 of FIG. 12). FIG. 14A illustrates process 1400, which can be performed in response to communication from a data quality monitoring system (e.g., 1210 of FIG. 12). At 1402, the process beings. At 1404, the database system receives instructions to perform synthetic anomaly injection on a base data set stored by the database system. For example, the database system receives instructions to inject synthetic anomalies into Data Set 2 stored at DB Location B and into Data Set 5 at DB Location E as described in the example with respect to FIG. 13A. At 1406, the database system creates a copy of the modified data in a different location than the base data set. For example, the database system creates copies of Data Set 2 at DB Location Y and of Data Set 5 at DB Location Z as described in the example with respect to FIG. 13A. At 1408, the database system records the location (or locations) of the modified data in a lookup table entry (or entries). For example, the database system creates entries for Data Set 2 and Data Set 5 as illustrated in lookup table 1320 of FIG. 13A. in some embodiments, instead of creating a copy and recording the location in a lookup table, the database system creates a lookup table entry (or entries) that includes an identifier of target base data and instructions for modifying the base data (e.g., as described with respect to lookup table 1360 of FIG. 13B).

FIG. 14B illustrates process 1450, which can be performed in response to communication from a data quality monitoring system (e.g., 1210 of FIG. 12). At 1452, the process beings. At 1454, the database system receives a query directed to data of a base data set. For example, the database system receives a query for data from a data quality monitoring system that is performing anomaly detection. In this example, the monitoring system can submit (or cause another resource to submit) a query received by the database system for data of the base data set. The data of the base data set may or may not be subject to synthetic anomaly injection operations. At 1456, the database system determines if the data of the base data set is subject to an active lookup table entry. For example, for a query directed to Data Set 2 at DB Location B in the example in FIG. 13A or 13B, the database system determines if a lookup table entry is active that identifies Data Set 2 (e.g., lookup tables 1320 or 1360). If the determination at 1456 is yes, process 1450 optionally proceeds to 1458. At 1458, the database system creates modified data according to the lookup table. For example, where a lookup table (e.g., 1360) includes instructions to perform injection operations, the database system can perform such operations (and save the resulting modified data). In examples where the modified data has already been created and stored (e.g., the example of FIG. 13A), 1458 can be omitted from process 1450. If the determination at 1456 is yes and 1458 is omitted, process 1450 proceeds to 1462. At 1462, the database system returns modified data in response to the query received at 1454. The modified data returned corresponds to the data of the base data set with the injection operations applied. For example, the database 1224 returns the queried data to a requesting application of data quality monitoring system 1210 (e.g., via database connector 1222). If the determination at 1456 is no, the process 1450 proceeds to 1460. At 1460, the database system returns the data of the base data set (e.g., unmodified by injection operations) in response to the query received at 1454. For example, the database 1224 returns the queried data to a requesting application of data quality monitoring system 1210 (e.g., via database connector 1222). At 1464, process 1450 ends.

FIG. 15 illustrates an example process for benchmarking an ML model used for anomaly detection. Process 1500 of FIG. 15 can be performed by one or more computing system (e.g., 1210, 1700). At 1502, a base data set to be used as input to a machine learning model is identified. For example, a data quality monitoring system receives or determines an identifier or location of a base data set (e.g., such as is shown in lookup table 1320). In some embodiments, the base data set includes snapshots of data over time (e.g., snapshots of a table from each day, showing how the table changes over time) (also referred to as a backtest data set). For example, these snapshots represent a historical sample from a particular data set over a consecutive period of days (e.g., usable to perform a backtest on that particular dataset). In some embodiments, the base data set includes multiple backtest data sets (e.g., sets of data usable to perform backtests for different tables or sets of data collectively referred to as the base data set).

At 1504, a modified base data set is generated by causing synthetic anomaly injection operations to be performed on data of the base data set. In some embodiments, the modified base data is created and stored by a remote database system (e.g., 1220 of FIG. 12). In some embodiments, the remote database system creates the modified base data, stores it, and creates an entry in a lookup table (e.g., 1320) with the location of the modified base data. In some embodiments, In some embodiments, the remote database system creates the modified base data from instructions stored in a lookup table (e.g., 1360) that includes instructions for generating the modified base data (e.g., injection operations to apply to the base data set).

At 1506, the ML model is caused to run, using the base data set as input, to determine a first output of the ML model. For example, the ML model performs anomaly detection on the base data set without any anomaly injection operations applied (e.g., to unmodified data). In some embodiments, the first output can include information such as anomaly scores, dynamic anomaly thresholds, or descriptions of detected anomalies (or groups of anomalies).

At 1508, the ML model is caused to run, using the modified base data set as input, to determine a second output of the ML model. For example, the ML model performs anomaly detection on the modified base data set without any anomaly injection operations applied (e.g., to unmodified data). In some embodiments, the first output can include information such as anomaly scores, dynamic anomaly thresholds, or descriptions of detected anomalies (or groups of anomalies).

At 1510, a set of performance metrics is determined based on the first output, the second output, and the set of known data modifications, the set of performance metrics representing performance of the ML model at detecting data anomalies. For example, the set of performance metrics can include metrics describing a false positive rate, a true positive rate, a false negative rate, and a true negative rate. These metrics can indicate when the ML model correctly or incorrection identified known data modifications (or lack of data modifications) as anomalies. The set of performance metrics can include one or more of: a length of time of running the ML model, a frequency of alerts generated to report data anomalies detected by the ML model, a precision of the ML model; a recall of the ML model, an F1 score of the ML model, or an average anomaly score output by ML model.

At 1512, a representation of the set of performance metrics is output (e.g., provided, transmitted, or displayed). For example, one or more visualizations or values representing at least one performance metric of the set of performance metrics is provided for display at a graphical user interface output of a data quality monitoring system.

Figure 16:
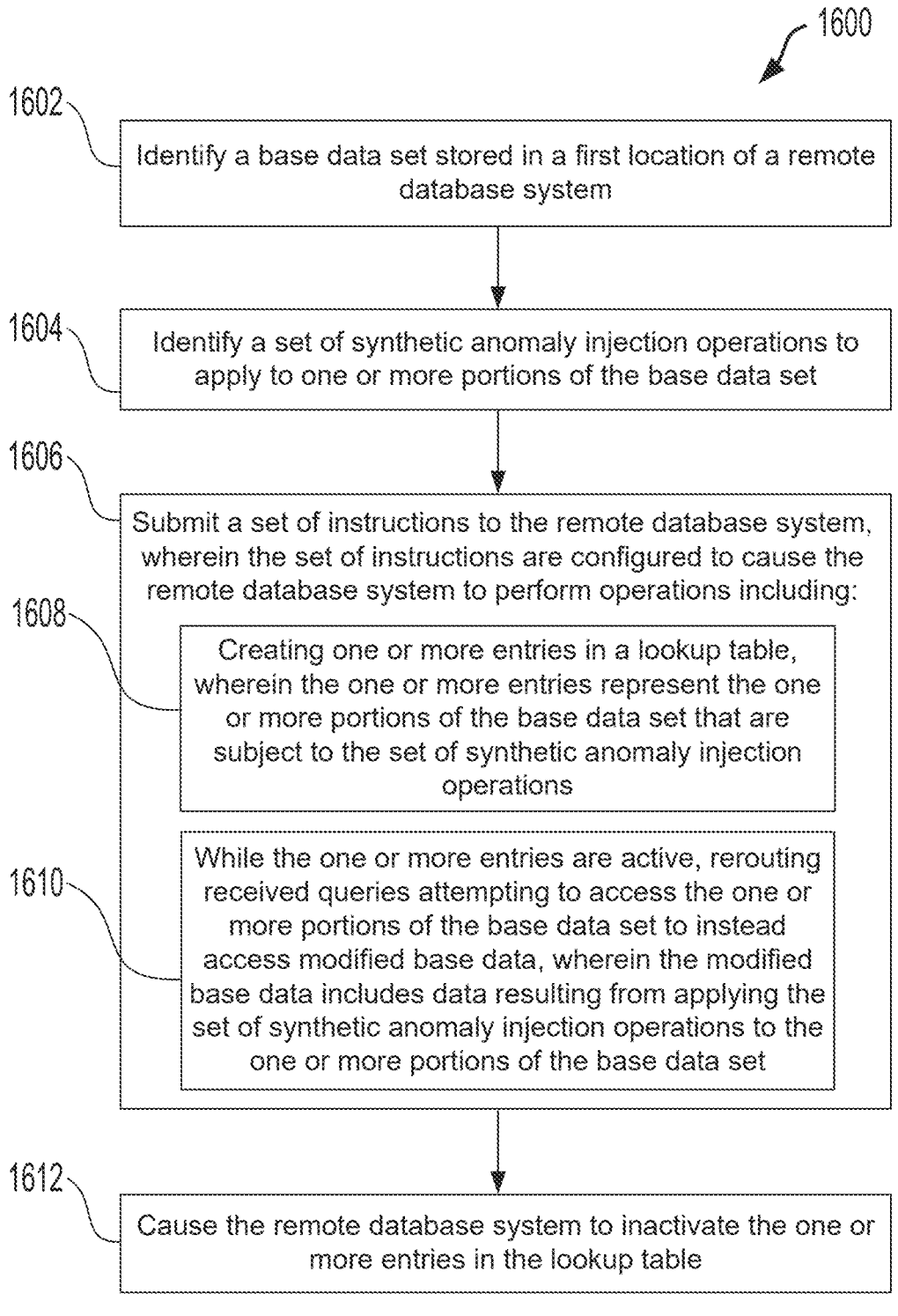
FIG. 16 illustrates an example process for injecting synthetic anomaly operations.

FIG. 16 illustrates an example process for injecting synthetic anomaly operations. Process 1500 of FIG. 15 can be performed by one or more computing system (e.g., 1210, 1700). At 1602, a base data set to be used as input to a machine learning model is identified. For example, a data quality monitoring system receives or determines an identifier or location of a base data set (e.g., such as is shown in lookup table 1320). In some embodiments, the base data set includes snapshots of data over time (e.g., snapshots of a table from each day, showing how the table changes over time) (also referred to as a backtest data set). For example, these snapshots represent a historical sample from a particular data set over a consecutive period of days (e.g., usable to perform a backtest on that particular dataset). In some embodiments, the base data set includes multiple backtest data sets (e.g., sets of data usable to perform backtests for different tables or sets of data collectively referred to as the base data set).

At 1604, a set of synthetic anomaly injection operations to apply to one or more portions of the base data set is determined. For example, portions of the base data set can be subsets (e.g., sets of structured data) within the base data set (e.g., such as Data Set 2 or Data Set 5 in the example of FIG. 13A). In some examples, the synthetic anomaly injection operations includes one or more of the operations described here, such as ColumnDropValue, ColumnGrow, ColumnIdentity, ColumnInfrequentDrop, ColumnModeDrop, or others. In some embodiments, the set of synthetic anomaly injection operations are selected randomly. In some embodiments, the set of synthetic anomaly injection operations are selected or applied using an iterative process.

At 1606, a set of instructions is submitted to the remote database system, the set of instructions configured to cause the remote database system to perform operations. At 1608, the operations include creating one or more entries in a lookup table, the one or more entries represent the one or more portions of the base data set that are subject to the set of synthetic anomaly injection operations. At 1610, the operations include, while the one or more entries are active, rerouting (e.g., rerouting or rewriting) received queries attempting to access the one or more portions of the base data set to instead access modified base data, the modified base data including data resulting from applying the set of synthetic anomaly injection operations to the one or more portions of the base data set.

At 1612, the remote database system is caused to inactivate the one or more entries of the lookup table. In some embodiments, inactivation is caused by one or more instructions transmitted to the remote database. In some embodiments, inactivation is caused by a data quality monitoring system disconnecting from the remote database (e.g., ending a session).

Figure 17:
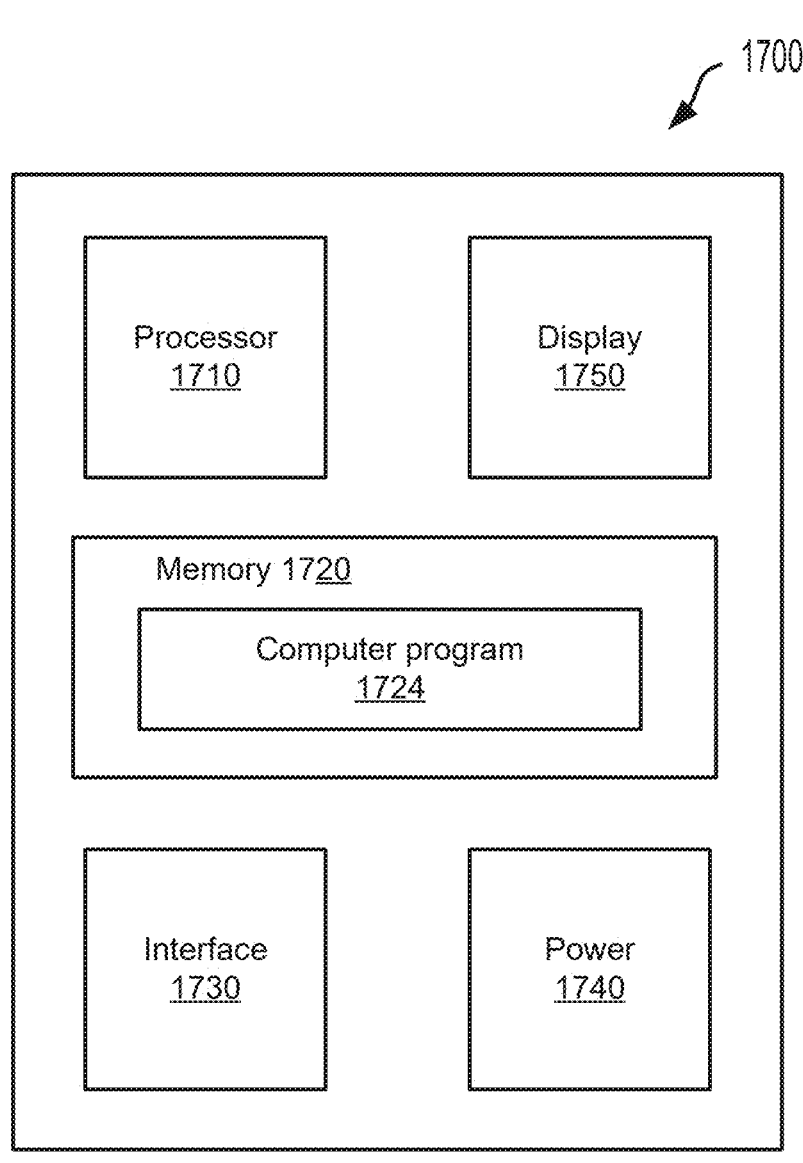
FIG. 17 is a block diagram showing an example computer system.

FIG. 17 is a block diagram showing an example computer system 1700 that includes a data processing apparatus and one or more computer-readable storage devices. Computer system 1700 can also be referred to as a computing system or device. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 1710. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 1724, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 1710, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 1720. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 1740 provides power to the other components of the computer system 1700. For example, the other components may operate based on electrical power provided by the power unit 1740 through a voltage bus or other connection. In some implementations, the power unit 1740 includes a battery or a battery system, for example, a rechargeable battery. In some implementations, the power unit 1740 includes an adapter (e.g., an AC adapter) that receives an external power signal (from an external source) and converts the external power signal to an internal power signal conditioned for a component of the computer system 1700. The power unit 1740 may include other components or operate in another manner.

To provide for interaction with a user, operations can be implemented on a computer having a display device, e.g., display 1750, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser, or by sending data to an application on a user's client device in response to requests received from the application.

The computer system 1700 may include a single computing device or multiple computers that operate in proximity or generally remote from each other and typically interact through a communication network, e.g., via interface 1730. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship with each other.

The example interface 1730 may provide communication with other systems or devices. In some cases, the interface 1730 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 1730 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect of what is described, synthetic data anomaly operations are applied to a base data set.

In a first example, a method performed by a computing system (e.g., 110, 1210, or 1700) includes: identifying a base data set to be used as input to a machine learning (ML) model, the base data set including one or more sets of structured data (e.g., datasets, tables, or snapshots); generating a modified base data set by causing synthetic anomaly injection operations to be performed on data of the base data set, the synthetic anomaly injection operations configured to create a set of known data modifications that are represented in the modified base data set; causing the ML model to run, using the base data set as input, to determine a first output of the ML model, wherein the first output includes a representation of data anomalies detected by the ML model in the base data set (e.g., information about anomalies such as anomaly scores, thresholds, descriptions of anomalies, or locations of anomalies in the data); causing the ML model to run, using the modified base data set as input, to determine a second output of the ML model, wherein the second output includes a representation of data anomalies detected by the ML model in the modified base data set (e.g., information about anomalies such as anomaly scores, thresholds, descriptions of anomalies, or locations of anomalies in the data); determining, based on the first output, the second output, and the set of known data modifications, a set of performance metrics representing performance of the ML model at detecting data anomalies, the set of performance metrics including: a true positive detection rate metric; a true negative detection rate metric; a false positive detection rate metric; and a false negative detection rate metric; and outputting a representation of the set of performance metrics.

Implementations of the first example may include one or more of the following features. Output of the ML model includes one or more of: a number of detected anomalies; one or more classifications (e.g., types or categories) of detected anomalies; one or more anomaly scores; one or more locations of detected anomalies in a respective data set used as input; and one or more values of data corresponding to detected anomalies. Classifications of detected anomalies include one or more of: missing value; incorrect value; invalid value; incomplete row; duplicate row; temporal inconsistency; and schema change. The base data set and the modified base data set do not include labeled data that has been pre-identified as including anomalies. The one or more sets of structured data includes data in tabular form. Data anomalies detected by the ML model represent an unexpected distribution change in one or more values in a respective data set used as input. Causing the ML model to run, using a respective data set as input, to determine output includes causing the ML model to sequentially process time periods represented by the respective data set to determine data anomalies for each time period. Causing the ML model to run, using the modified base data set as input, to determine the second output includes: causing the ML model to process multiple sets of structured data that have been subject to the synthetic anomaly injection operations, wherein processing each respective set of structured data of the multiple sets of structured data includes processing the respective set using an instance of the ML model that has not processed another set of structured data of the multiple sets of structured data.

Implementations of the first example may include one or more of the following features. The first output and the second output each include: a set of anomaly scores determined by the ML model; and a set of anomaly score thresholds set by the ML model. The set of anomaly scores includes an anomaly score for each data entry of the one or more sets of structured data. The set of anomaly score thresholds are dynamically set by the ML model over a set of time periods (e.g., days or periods of other length) represented by the one or more sets of structured data. The ML model detects an anomaly for a data entry of a respective data set when an anomaly score determined for the data entry exceeds an applicable anomaly score threshold. The method of comprising: causing a change to a hyperparameter of the ML model; causing the ML model with the change to the hyperparameter to run, using a data set as input, to determine third output of the ML model, wherein the third output includes a representation of data anomalies detected by the ML model in the data set; and determining a performance metric representing comparison of the performance of the ML model with and without the change to the hyperparameter. The set of performance metrics includes a metric representing an area under a curve (e.g., AUC), wherein the curve is a plot of the ratio of the true positive detection rate metric versus the false positive detection rate metric over a variable set of values of an anomaly score threshold of the ML model. The set of performance metrics includes an accuracy metric representing a percentage of time the ML model detected a known data modification of the set of known data modifications as a data anomaly. The second output includes descriptions of detected anomalies (e.g., describing why data was flagged as an anomaly); and wherein the set of performance metrics includes one or more metrics representing whether the descriptions of the detected anomalies included in the second output match corresponding descriptions of the known data modifications (e.g., describing what changes synthetic anomaly injection operations caused in the data) that were detected as data anomalies by the ML model. The set of performance metrics includes one or more metrics representing one or more of: a length of time of running the ML model; a frequency of alerts generated to report data anomalies detected by the ML model; a precision of the ML model; a recall of the ML model; an F1 score of the ML model; and an average anomaly score output by ML model. The representation of the set of performance metrics includes one or more visualizations.

In a second example, a method performed by a computing system (e.g., 110, 1210, or 1700) includes: identifying a base data set stored in a first location of a remote database system (e.g., 1220), the base data set including one or more sets of structured data; identifying a set of synthetic anomaly injection operations to apply to one or more portions (e.g., datasets, tables, columns, rows, or snapshots) of the base data set; submitting a set of instructions to the remote database system, wherein the set of instructions are configured to cause the remote database system to perform operations including: creating one or more entries in a lookup table, wherein the one or more entries represent the one or more portions of the base data set that are subject to the set of synthetic anomaly injection operations; and while the one or more entries are active, rerouting received queries attempting to access the one or more portions of the base data set to instead access modified base data, wherein the modified base data includes data resulting from applying the set of synthetic anomaly injection operations to the one or more portions of the base data set; and causing the remote database system to inactivate the one or more entries in the lookup table, wherein while the one or more entries are inactive, the remote database system ceases rerouting received queries attempting to access the one or more portions of the base data set to instead access the modified base data.

Implementations of the second example may include one or more of the following features. The one or more entries identify the one or more portions of the base data set that are subject to the set of synthetic anomaly injection operations. The one or more entries indicate a storage location of the modified base data (e.g., address in a database). The one or more entries indicate one or more instructions for generating the modified base data. Rerouting received queries includes rewriting the received queries to point to a storage location of the modified base data. The set of queries are configured to cause the remote database system to perform operations including: while the one or more entries are active, routing received queries attempting to access one or more portions of the base data that are not subject to the set of synthetic anomaly injection operations to corresponding data of the base data set stored in the first location. The set of instructions are configured to cause the remote database system to perform operations including: while the one or more entries are inactive, routing received queries attempting to access the base data to corresponding data of the base data set stored in the first location. The method comprising: sending an instruction to the remote database system to inactivate the one or more entries. The method comprising: disconnecting from the remote database system, wherein disconnecting from the remote database system causes the remote database system to inactivate the one or more entries. Causing the remote database system to inactivate the one or more entries includes causing the remote database system to perform one or more of the following operations: deleting the one or more entries from the lookup table; deleting the lookup table; and deleting the modified base data.

Implementations of the second example may include one or more of the following features. Identifying the set of synthetic anomaly injection operations to apply to the one or more portions of the base data set includes determining one or more of: selecting one or more predefined synthetic anomaly injection operations (e.g., from a library of synthetic anomaly injection operations); determining a fraction (e.g., chaos fraction) of the base data set that will be subject to the synthetic anomaly injection operations; and selecting which portions (e.g., tables, datasets, columns, rows, or snapshots) of the base data set will be subject to the synthetic anomaly injection operations. Identifying the set of synthetic anomaly injection operations to apply to the one or more portions of the base data set includes performing an iterative process that includes: selecting one or more candidate synthetic anomaly injection operations; and assessing a result of applying the one or more candidate synthetic anomaly injection operations to a candidate portion of the base data set. Assessing the result of applying the one or more candidate synthetic anomaly injection operations includes determining whether the result is different from the candidate portion of the base data set; performing the iterative process includes: excluding the one or more candidate synthetic anomaly injection operations from the set of synthetic anomaly injection operations in response to a determination that the result is not different from the candidate portion of the base data set; and including the one or more candidate synthetic anomaly injection operations in the set of synthetic anomaly injection operations in response to a determination that the result is different from the candidate portion of the base data set.

Implementations of the second example may include one or more of the following features. Performing data processing operations (e.g., with or without an ML model) while the one or more entries in the lookup table are active, the data processing operations including submitting queries to the remote database system attempting to access the one or more portions of the base data set; and determining a performance metric representing the impact that applying the synthetic anomaly injection operations to the base data set has on a performance of the data processing operations. Performing data processing operations while the one or more entries in the lookup table are inactive, the data processing operations including submitting queries to the remote database system attempting to access the one or more portions of the base data set; and determining the performance metric is based on results of performing the data processing operations while the one or more entries are active and based on results of performing the data processing operations while the one or more entries are inactive.

Implementations of the second example may include one or more of the following features. The set of instructions are configured to cause the remote database system to perform operations including: applying the set of synthetic anomaly injection operations to the one or more portions of the base data to create the modified base data. The set of instructions are configured to cause the remote database system to perform operations including: storing the modified base data at a second location of the remote database system different from the first location, wherein the base data set stored in the first location remains unmodified by the set of synthetic anomaly injection operations and by storage of the modified base data. The remote database system includes: a database (e.g., 1224) for storing data; and a database connector (e.g., 1222) that provides an interface for accessing the database. The lookup table is stored in the database connector. The modified base data is stored in the database. The modified base data is stored in memory in the database connector. The database is a Structured Query Language (SQL) database.

In a third example, a system (e.g., 110, 1210, or 1700) includes one or more processors, and a computer-readable medium storing instructions that are operable when executed by the one or more processors to perform one or more operations of the first example or the second example.

In a fourth example, a non-transitory computer-readable medium storing instructions that are operable when executed by a data processing apparatus (e.g., of 1700) to perform one or more operations of the first example or second example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method performed by a computing system, the method comprising:
   identifying a base data set stored in a first location of a remote database system, the base data set including one or more sets of structured data;
   identifying a set of synthetic anomaly injection operations to apply to one or more portions of the base data set;
   submitting a set of instructions to the remote database system, wherein the set of instructions are configured to cause the remote database system to perform operations including:
      creating one or more entries in a lookup table, wherein the one or more entries represent the one or more portions of the base data set that are subject to the set of synthetic anomaly injection operations;
      determining that the one or more entries are active; and
      while the one or more entries are active, rerouting received queries attempting to access the one or more portions of the base data set to instead access modified base data, wherein the modified base data includes data resulting from applying the set of synthetic anomaly injection operations to the one or more portions of the base data set; and
   causing the remote database system to inactivate the one or more entries in the lookup table, wherein while the one or more entries are inactive, the remote database system ceases rerouting the received queries attempting to access the one or more portions of the base data set to instead access the modified base data.

2. The method of claim 1, wherein the one or more entries identify the one or more portions of the base data set that are subject to the set of synthetic anomaly injection operations.

3. The method of claim 1, wherein the one or more entries indicate a storage location of the modified base data.

4. The method of claim 1, wherein the one or more entries indicate one or more instructions for generating the modified base data.

5. The method of claim 1, wherein rerouting the received queries includes rewriting the received queries to point to a storage location of the modified base data.

6. The method of claim 1, wherein the set of instructions are configured to cause the remote database system to perform operations including:
   while the one or more entries are active, routing the received queries attempting to access one or more portions of the base data that are not subject to the set of synthetic anomaly injection operations to corresponding data of the base data set stored in the first location.

7. The method of claim 1, wherein the set of instructions are configured to cause the remote database system to perform operations including:
   while the one or more entries are inactive, routing the received queries attempting to access the base data to corresponding data of the base data set stored in the first location.

8. The method of claim 1, comprising:
   sending an instruction to the remote database system to inactivate the one or more entries.

9. The method of claim 1, comprising:
   disconnecting from the remote database system, wherein disconnecting from the remote database system causes the remote database system to inactivate the one or more entries.

10. The method of claim 1, wherein causing the remote database system to inactivate the one or more entries includes causing the remote database system to perform one or more of the following operations:
   deleting the one or more entries from the lookup table;
   deleting the lookup table; and
   deleting the modified base data.

11. The method of claim 1, wherein identifying the set of synthetic anomaly injection operations to apply to the one or more portions of the base data set includes determining one or more of:
   selecting one or more predefined synthetic anomaly injection operations;
   determining a fraction of the base data set that will be subject to the synthetic anomaly injection operations; and
   selecting which portions of the base data set will be subject to the synthetic anomaly injection operations.

12. The method of claim 1, wherein identifying the set of synthetic anomaly injection operations to apply to the one or more portions of the base data set includes performing an iterative process that includes:
   selecting one or more candidate synthetic anomaly injection operations; and
   assessing a result of applying the one or more candidate synthetic anomaly injection operations to a candidate portion of the base data set.

13. The method of claim 12, wherein:

assessing the result of applying the one or more candidate synthetic anomaly injection operations includes determining whether the result is different from the candidate portion of the base data set;

performing the iterative process includes:

excluding the one or more candidate synthetic anomaly injection operations from the set of synthetic anomaly injection operations in response to a determination that the result is not different from the candidate portion of the base data set; and including the one or more candidate synthetic anomaly injection operations in the set of synthetic anomaly injection operations in response to a determination that the result is different from the candidate portion of the base data set.

14. The method of claim 1, comprising:

performing data processing operations while the one or more entries in the lookup table are active, the data processing operations including submitting queries to the remote database system attempting to access the one or more portions of the base data set; and determining a performance metric representing the impact that applying the synthetic anomaly injection operations to the base data set has on a performance of the data processing operations.

15. The method of claim 14, comprising:

performing data processing operations while the one or more entries in the lookup table are inactive, the data processing operations including submitting queries to the remote database system attempting to access the one or more portions of the base data set; and wherein determining the performance metric is based on results of performing the data processing operations while the one or more entries are active and based on results of performing the data processing operations while the one or more entries are inactive.

16. The method of claim 1, wherein the set of instructions are configured to cause the remote database system to perform operations including:

applying the set of synthetic anomaly injection operations to the one or more portions of the base data to create the modified base data.

17. The method of claim 16, wherein the set of instructions are configured to cause the remote database system to perform operations including:

storing the modified base data at a second location of the remote database system different from the first location, wherein the base data set stored in the first location remains unmodified by the set of synthetic anomaly injection operations and by storage of the modified base data.

18. The method of claim 1, wherein the remote database system includes:

a database for storing data; and a database connector that provides an interface for accessing the database.

19. The method of claim 18, wherein the lookup table is stored in the database connector.

20. The method of claim 18, wherein the modified base data is stored in the database.

21. The method of claim 18, wherein the modified base data is stored in memory in the database connector.

22. The method of claim 1, wherein the remote database system is a Structured Query Language (SQL) database.

23. A system comprising:

one or more processors; and a computer-readable medium storing instructions that are operable when executed by the one or more processors to perform operations comprising:

identifying a base data set stored in a first location of a remote database system, the base data set including one or more sets of structured data;

identifying a set of synthetic anomaly injection operations to apply to one or more portions of the base data set;

submitting a set of instructions to the remote database system, wherein the set of instructions are configured to cause the remote database system to perform operations including:

creating one or more entries in a lookup table, wherein the one or more entries represent the one or more portions of the base data set that are subject to the set of synthetic anomaly injection operations; and while the one or more entries are active, rerouting received queries attempting to access the one or more portions of the base data set to instead access modified base data, wherein the modified base data includes data resulting from applying the set of synthetic anomaly injection operations to the one or more portions of the base data set; and causing the remote database system to inactivate the one or more entries in the lookup table, wherein while the one or more entries are inactive, the remote database system ceases rerouting the received queries attempting to access the one or more portions of the base data set to instead access the modified base data.

24. A non-transitory computer-readable medium storing instructions that are operable when executed by a data-processing apparatus to perform operations comprising:

identifying a base data set stored in a first location of a remote database system, the base data set including one or more sets of structured data;

identifying a set of synthetic anomaly injection operations to apply to one or more portions of the base data set;

submitting a set of instructions to the remote database system, wherein the set of instructions are configured to cause the remote database system to perform operations including:

creating one or more entries in a lookup table, wherein the one or more entries represent the one or more portions of the base data set that are subject to the set of synthetic anomaly injection operations; and while the one or more entries are active, rerouting received queries attempting to access the one or more portions of the base data set to instead access modified base data, wherein the modified base data includes data resulting from applying the set of synthetic anomaly injection operations to the one or more portions of the base data set; and causing the remote database system to inactivate the one or more entries in the lookup table, wherein while the one or more entries are inactive, the remote database system ceases rerouting the received queries attempting to access the one or more portions of the base data set to instead access the modified base data.

* * * * *